United States Patent
Marks

(10) Patent No.: US 11,418,460 B2
(45) Date of Patent: Aug. 16, 2022

(54) FLOW-ZONE SWITCHING

(71) Applicant: Roger B. Marks, Denver, CO (US)

(72) Inventor: Roger B. Marks, Denver, CO (US)

(73) Assignee: Consensii LLC, Denver, CO (US)

( * ) Notice: Subject to any disclaimer, the term of this patent is extended or adjusted under 35 U.S.C. 154(b) by 93 days.

(21) Appl. No.: 16/613,354

(22) PCT Filed: May 14, 2018

(86) PCT No.: PCT/US2018/032603
§ 371 (c)(1),
(2) Date: Nov. 13, 2019

(87) PCT Pub. No.: WO2018/213202
PCT Pub. Date: Nov. 22, 2018

(65) Prior Publication Data
US 2020/0195582 A1    Jun. 18, 2020

Related U.S. Application Data

(60) Provisional application No. 62/619,914, filed on Jan. 22, 2018, provisional application No. 62/506,240, filed on May 15, 2017.

(51) Int. Cl.
| | | |
|---|---|---|
| H04L 12/947 | (2013.01) | |
| H04L 12/741 | (2013.01) | |
| H04L 12/753 | (2013.01) | |
| H04L 49/25  | (2022.01) | |
| H04L 45/74  | (2022.01) | |
| H04L 45/48  | (2022.01) | |

(52) U.S. Cl.
CPC .............. *H04L 49/25* (2013.01); *H04L 45/48* (2013.01); *H04L 45/74* (2013.01)

(58) Field of Classification Search
CPC ......... H04L 45/74; H04L 49/25; H04L 45/48; H04L 45/38; H04L 69/22; H04L 61/6004; H04L 45/04; H04L 45/72; H04L 29/1299; H04L 29/12801
See application file for complete search history.

(56) References Cited

U.S. PATENT DOCUMENTS

| | | | |
|---|---|---|---|
| 5,740,171 A  | 4/1998  | Mazzola |
| 7,006,472 B1 | 2/2006  | Immonen |
| 7,095,738 B1 | 8/2006  | Desanti |
| 7,457,300 B2 | 11/2008 | Christensen |
| 7,564,850 B2 | 7/2009  | Wu |
| 7,710,936 B2 | 5/2010  | Morales Barroso |

(Continued)

OTHER PUBLICATIONS

Radhika Niranjan Mysore et al., "PortLand: A Scalable Fault-Tolerant Layer 2 Data Center Network Fabric" ACM SIGCOMM Computer Communication Review 39(4):39-50, Aug. 2009, USA.

(Continued)

*Primary Examiner* — Pankaj Kumar
*Assistant Examiner* — Kenneth P Hunt

(57) ABSTRACT

Flow-zone switching provides for the switching of frames through a network, basing forwarding decisions on location and flow information encoded in the frames, such as in the source and destination addresses. Various address formats are disclosed, supporting transfer of packet data among data switches as well as among endpoints. Systems, apparatuses, and methods are disclosed.

14 Claims, 16 Drawing Sheets

(56) References Cited

U.S. PATENT DOCUMENTS

| | | | | |
|---|---|---|---|---|
| 8,175,107 | B1* | 5/2012 | Yalagandula | H04L 45/66 370/408 |
| 8,462,794 | B2 | 6/2013 | Dobbins | |
| 8,483,096 | B2 | 7/2013 | Vahdat | |
| 9,143,455 | B1 | 9/2015 | Hughes | |
| 10,187,309 | B1* | 1/2019 | Vincent | H04L 47/11 |
| 2007/0028001 | A1 | 2/2007 | Phillips | |
| 2007/0201490 | A1 | 8/2007 | Mahamuni | |
| 2008/0181243 | A1 | 7/2008 | Vobbiltsetty | |
| 2009/0307334 | A1 | 3/2009 | Maltz | |
| 2011/0096781 | A1 | 4/2011 | Aybay | |
| 2011/0235640 | A1 | 9/2011 | Singh | |
| 2012/0243539 | A1* | 9/2012 | Keesara | H04L 45/66 370/392 |
| 2013/0279503 | A1* | 10/2013 | Chiabaut | H04L 45/44 370/389 |
| 2015/0169351 | A1* | 6/2015 | Song | H04L 45/66 718/1 |
| 2015/0244633 | A1* | 8/2015 | Aybay | H04L 47/2441 709/234 |
| 2017/0171072 | A1* | 6/2017 | Bogdanovic | H04L 45/74 |
| 2017/0187614 | A1* | 6/2017 | Haramaty | H04L 45/48 |

OTHER PUBLICATIONS

Douglas Comer, et al. "DCnet: A new data center network architecture" 2017 IEEE 7th Annual Computing and Communication Workshop and Conference (CCWC), USA.

Malcolm Scott et al., "Addressing the Scalability of Ethernet with MOOSE" First Workshop on Data Center—Converged and Virtual Ethernet Switching (DC CAVES), ITC 21, Paris, France Sep. 2009.

Mohammad Al-Fares, et al., "A scalable, commodity data center network architecture" ACM SIGCOMM Computer Communication Review 38(4):63-74, Oct. 2008, USA.

Chuanxiong Guo, et al., "SecondNet: A Data Center Network Virtualization Architecture with Bandwidth Guarantees" ACM CONEXT 2010, Nov. 2010, USA.

Elisa Rojas, et al., "Torii: multipath distributed Ethernet fabric protocol for data centres with zero-loss path repair" Transactions on Emerging Telecommunications Technologies 2015; 26:179-194, Aug. 11, 2014, Wiley Online Library.

Elisa Rojas, et al., "All-Path Routing Protocols: Analysis of Scalability and Load Balancing Capabilities for Ethernet Networks" arXiv:1703.08744, Mar. 25, 2017.

Roger B. Marks, Separation of Access and Core Partitioning in the Local Space, IEEE 802-privecsg-14-0019-01-0000, Nov. 4, 2014, IEEE, USA.

Roger B. Marks, Zonal Address Partitioning in the Local Space, IEEE 802-ec-14-0071-01-00EC, Nov. 3, 2014, IEEE, USA.

Roger B. Marks, Opportunities for New IEEE 802 Switching Protocols in Local Space, lasg-marks-local-address-switching-0115-v00, Jan. 12, 2015, IEEE, USA.

Roger B. Marks, Address Assignment for Stateless Flow-Zone Switching in the Data Center, cq-Marks-flow-zone-addressing-0118-v00, Jan. 24, 2018, IEEE, USA.

* cited by examiner

Fig. 4

| field | DA | SA | T | Data | FCS |
|---|---|---|---|---|---|
| length (bytes) | 6 | 6 | 2 | 46 to 1500 or more | 4 |

402　404　406　408　410

218

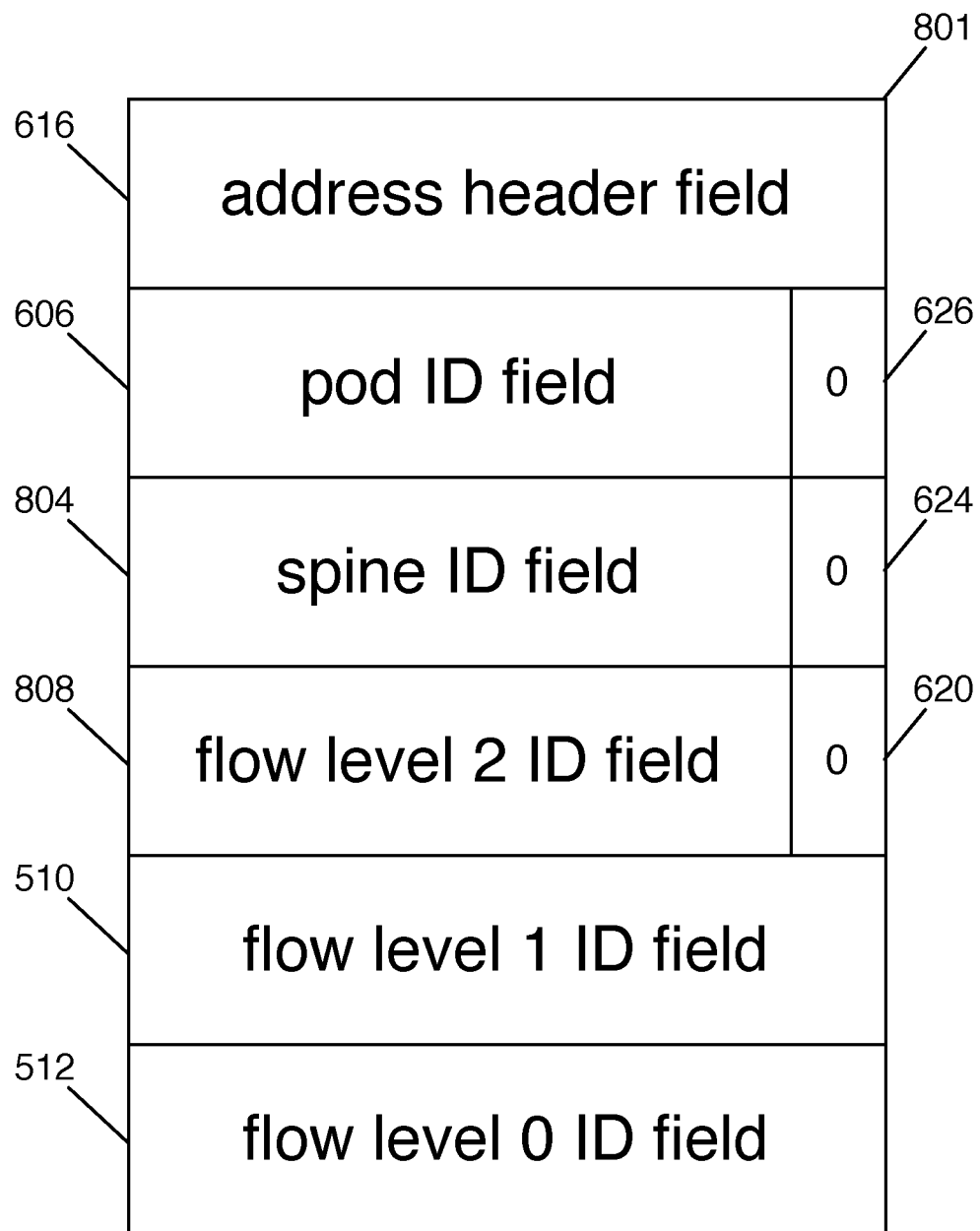

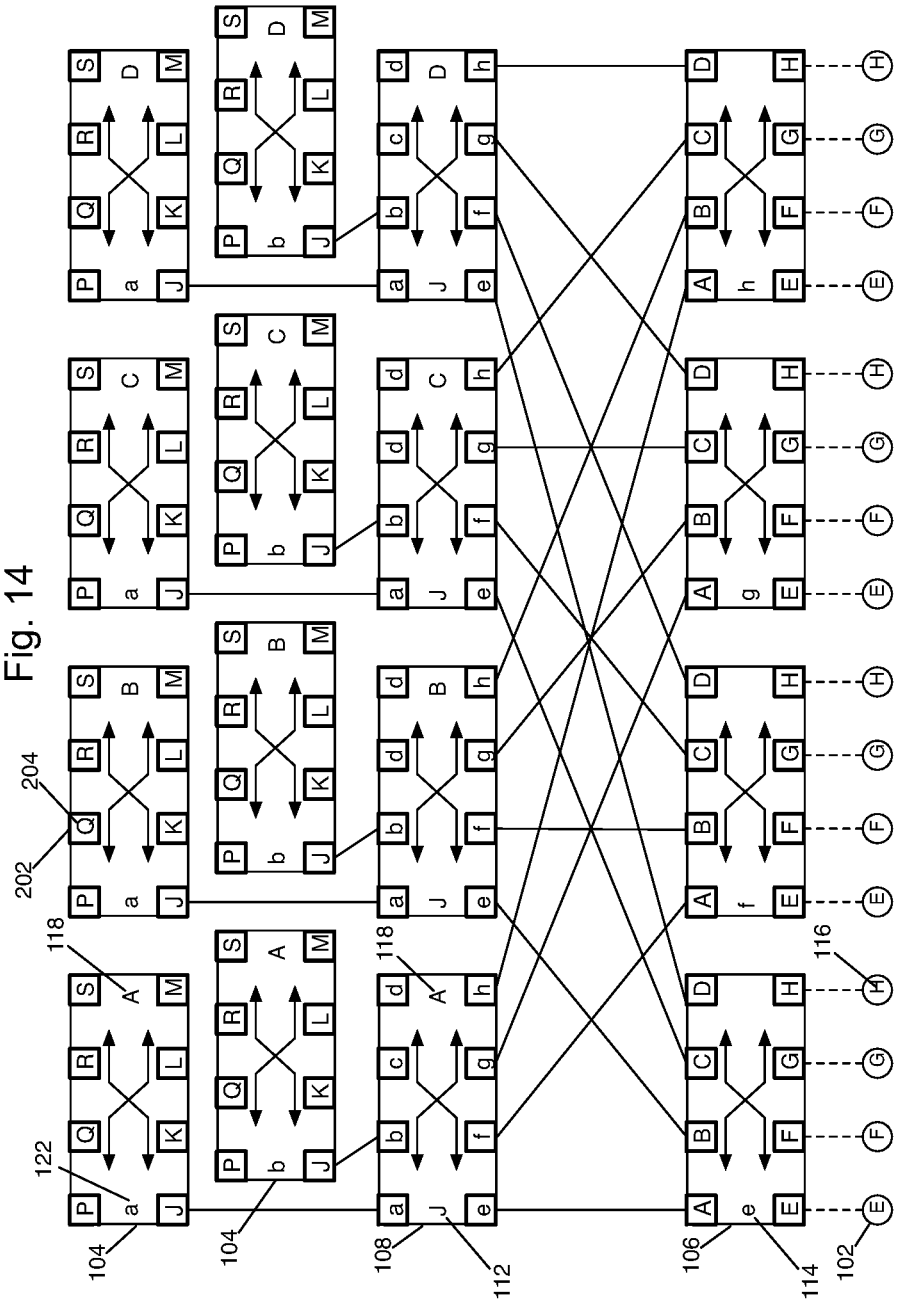

Fig. 15

| 1501 | | start |
|---|---|---|
| 1502 | Spine switch | sends a message to each enabled port, indicating that recipient's pod ID is 7 lsb of <outgoing spine switch port ID> |
| 1504 | Fabric switch | •receives messages sent by spine switches at Step 1502<br>•identifies those ports as connected to spine switches<br>•confirms that all received messages are consistent<br>•identifies itself as a fabric switch<br>•configures its pod ID value as received value<br>•replies to each spine switch, indicating that recipient's spine switch ID is 7 lsb of <outgoing fabric switch port ID> |
| 1506 | Fabric switch | •sends a message to each other enabled port, indicating that recipient's pod ID is <sender's pod ID> and rack ID is 7 lsb of <outgoing fabric switch port ID> |
| 1508 | Rack switch | •receives messages sent by fabric switches at Step 1506<br>•identifies those ports as connected to fabric switches<br>•confirms that all received messages are consistent<br>•identifies itself as a rack switch<br>•configures its pod ID and rack ID value as received<br>•replies to each fabric switch, indicating that recipient's spine ID is 7 lsb of <outgoing rack switch port ID> |
| 1510 | Rack switch | •sends a message to each other enabled port, indicating that recipient's pod ID is <sender's pod ID>, rack ID is <sender's rack ID>, and server ID is 7 lsb of <outgoing rack switch port ID> |
| 1512 | Server | •receives message sent by rack switch at Step 1510<br>•configures its pod ID, rack ID, and server ID value as received |
| 1514 | Fabric switch | •receives messages sent by rack switches at Step 1508<br>•identifies those ports as connected to rack switches<br>•confirms that all messages from rack switches are consistent<br>•configures its switch ID value as received |
| 1516 | | stop |

FLOW-ZONE SWITCHING

RELATED APPLICATION DATA

The present application is related to, and claims the priority benefit of, commonly-assigned and U.S. Application Ser. No. 62/506,240, entitled Flow-Zone Switching Network, filed on 15 May 2017 (15-05-2017), and 62/619,914, entitled Flow-Zone Address Network, filed on 22 Jan. 2018 (22-01-2018), which applications are incorporated herein by reference in their entireties.

TECHNICAL FIELD

The present disclosure relates to data switching and addressing, particularly to switching with zonal and flow-based addressing.

BACKGROUND

Layer 2 networks, such as those based on Ethernet, support data switching (versions of which are often known in Layer 2 networks as "bridging") and are prominent in many networking applications. Layer 2 switching is known to have benefits. To the extent that data may be successfully forwarded through a network without the need for Layer 3 forwarding, it may be possible to bypass Layer 3 and the extra overhead it entails in data delivery.

However, Layer 2 networking is not widely used for applications such as data-center switch fabrics. Modern data centers typically utilize network structures such as the generalized fat-tree network structure, which, among other advantages, enables connectivity between a large number of ports (commensurate with the need to interconnect, for example, hundreds of thousands or millions of physical servers) using switches of moderate port count. These generalized fat-tree-like structures typically provide multiple paths between pairs of communicating nodes; the use of the multiple paths helps to provide higher data rates than could be supported on any link alone. However, the existence of multiple paths leads to the well-known problem of loops in Layer 2 networks. Many technologies have been developed to overcome the loop problem, but in many cases the result fails to take advantage of the entire network capacity. This loop problem is one reason that Layer 2 networking has not been popular in the data center.

In Layer 2 data networks, frames are typically switched based on the content of the Destination Address (DA) field embedded in the frame. The data switch typically reads the DA field and looks up the resulting address (along with possibly other information, such as a VLAN identifier) in a forwarding database that provides a forwarding port for the frame based on that lookup. This presumes that the forwarding database includes a record indicating the correct port of the unique device matching the DA. Typically, that information, if stored in the forwarding database, has been determined following receipt, by the switch, of an earlier frame bearing the same address in the Source Address (SA) field. Upon such receipt, the switch learns the association of the port with the address in the SA field and, inferring that the same port is the correct one to which to forward frames with the same address in the DA field, populates the forwarding database accordingly.

If the address identified in the DA is not found in the forwarding database, the switch typically "floods" the frame by forwarding it to all ports, with the expectation that this will lead to its delivery regardless of which port leads to it. Flooding can consume a large amount of resource in the network, particularly when many unknown devices access it.

The problems of loops, learning, and flooding can be partially overcome when the network elements are stable over a long interval. However, another significant problem is related to scale and may be more challenging. The forwarding database of the Layer 2 switch needs to contain an entry for the destination address of any frame it receives. In a data center, this could require some switches to store and recall hundreds of thousands, or more, of addresses, a capability that can add significant expense, especially considering that the addresses are large, typically 48 or more bits. Large databases can also be time-consuming to search.

In conventional Layer 2 data networks, such as IEEE 802 networks, one particular bit in the address identifies that address as either a global address or a local address. Global addresses are expected to be universal and are therefore generally assigned to the hardware in the manufacturing phase ("burned in"). It is impossible to change or assign such an address within the scope of the standards (other than to toggle a single bit to indicate unicast or multicast). It is therefore impossible to organize global addresses into a structure that could be interpreted during network switching and frame delivery. The address structure is non-hierarchical and "flat."

Global addresses, because of the requirement to be unique throughout all space and time (over many decades), must be large. Layer 2 networks, because of their need to be compatible with global addresses, are constructed on the basis of large addresses, even though the span of the network is local.

The local address space, which is the space of addresses in which the "local" bit is set on, is not subject to universal uniqueness, and addresses are not permanently assigned to devices. Therefore, opportunities exist to exploit the large address space, creating structure to aid in switching mechanisms and frame delivery.

As this disclosure demonstrates, use of the local address space provides the opportunity to solve some of the major problems associated with flat Layer 2 networks, particularly in generalized fat-tree-like configurations.

An additional issue with generalized fat-tree-like configurations is how to exploit the redundant routes most effectively. The Layer 2 solution demonstrated in the embodiments here is able to do this effectively, particularly when extended, as illustrated, to include elements in the Layer 2 frame to identify flows and flow types.

BRIEF DESCRIPTION OF DRAWINGS

The disclosure will be understood more fully from the detailed description given below and from the accompanying drawings of various embodiments of the invention, which, however, should not be taken to limit the invention to the specific embodiments but are for explanation and understanding only. The quantity of entities shown in the drawings is for exemplification purposes only and does not indicate any restriction regarding the actual number of such entities.

FIG. 4 illustrates a conventional Ethernet frame;

FIG. 8 illustrates an embodiment of a fabric switch flow-zone address;

FIG. 14 illustrates an example of identity numbering to achieve port forwarding by inspection;

FIG. 15 illustrates an embodiment of automated configuration procedure 1500.

DETAILED DESCRIPTION

Figure 1:
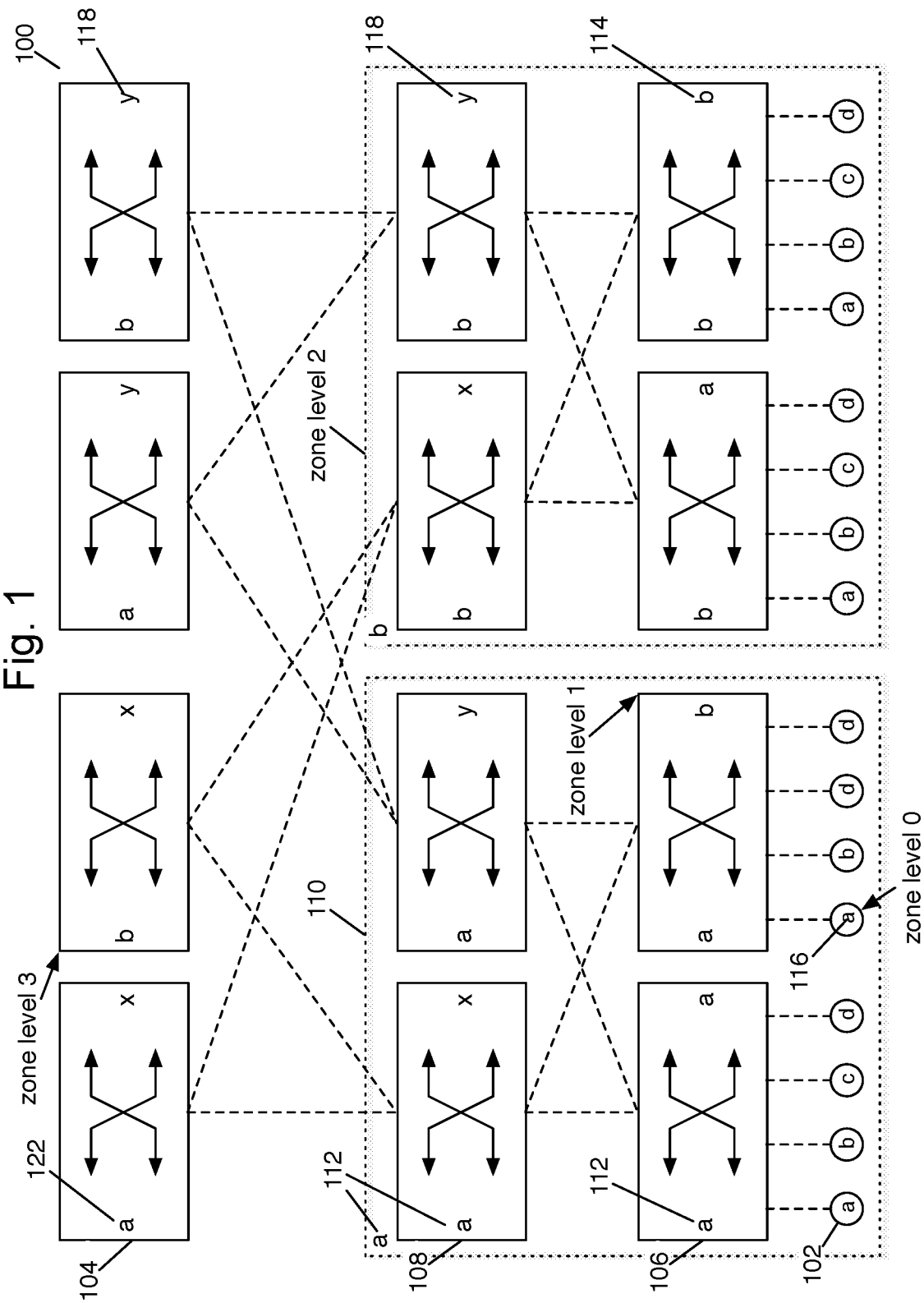
FIG. 1 illustrates an embodiment of a flow-zone network.

The following description is presented to enable any person skilled in the art to make and use the embodiments. Various modifications to the disclosed embodiments will be readily apparent to those skilled in the art, and the general principles described herein are applicable to other embodiments and applications without departing from the spirit and scope of the present disclosure. Thus, the present invention is not limited to the embodiments shown but is to be accorded the widest scope consistent with the principles and features disclosed herein.

For example, while the embodiments primarily illustrate the use of the method in regard to switching of Layer 2 frames, the method is applicable at other network layers, including, for example, switching of Layer 3 packets. In this disclosure, the terms "packet" and "frame" are both used to generally indicate a block of data, independent of the layer. More specifically, the terms "Layer 2 frame" and "Layer 3 packet" are used herein to indicate blocks of data used at Layer 2 and Layer 3, respectively.

Overview

This overview should not be taken to limit the invention to the specific embodiments but is for explanation and understanding only.

In an embodiment of this disclosure, local Layer 2 addresses in a data switching network are assigned hierarchically, with part of the data frame address representing one or more topological zones. Zones may be organized as a hierarchy of zone levels. For forwarding among zones, data switches may need know only the association between a zone (or an aspect of the zone, such as its place in the hierarchy) and the forwarding port, instead of the association between the entire address and the forwarding port. This has many advantages. One is that the zone identifier is less costly to store and search since it is shorter than the entire address. Another is that the zone identifier's association with the port is relevant to not only a single address (and a single device) but to a block of addresses to or through that zone as seen by the switch. Thus, the forwarding database is far more compact; it includes fewer records, and the records themselves are smaller since the zone identifier is represented in only a portion of the address. In some circumstances, the forwarding database may be eliminated entirely, as disclosed herein, by selecting the zone identifiers so as to directly indicate the associated ports. The need for flooding due to an unknown address is significantly reduced or eliminated because a frame with an unstored address need not be flooded as long as the port toward the address's zone can be identified.

As disclosed herein, zonal address forwarding may be applied to treelike hierarchies and to more complex topologies, such as generalized fat-tree networks.

In addition to the zone identifier, the local Layer 2 address is disclosed to contain one or more flow identifiers. These can serve multiple purposes. They can differentiate the structure within a zone, particularly within the lowest level of the zonal hierarchy. They can also differentiate frames into flows. This allows for, for example, the compact specification of routing, queueing, flow management, packet compression, and QoS. For example, when multiple routes exist from source to destination, differentiated flow identifiers can be used to steer different frames to different routes, while ensuring that all frames of a flow follow the same route. As another example, frame header suppression or compression can be enacted for all frames of a flow at the source, with the original frame restored at the destination based on knowledge of the flow identity.

In this disclosure, we also disclose the use of flow type identifiers that identify not the flow but the type of flow. If the switch is suitably outfitted with a database linking the flow identifiers to the associated flow type, then a separate flow type identifier could be made obsolete. However, supplying each switch with such a database would be a burden. The flow type identifier allows the switch to determine useful type information characterizing the flow without needing to identify the flow uniquely. This may allow for more efficient operation. Once the switch has identified the destination zone, it is enabled to make forwarding decisions. However, due to the existence of multiple routes to the destination zone, the switch may be required to select from among those routes, and the flow identifier or flow type identifier may aid in making efficient selections. Other decisions, about for example queueing and packet delay, may also be dependent on the flow type identifier (and, in some cases, the flow identifier). This may be used to enhance the efficacy of the decision-making process and of the flow-zone switching network.

Physical Switching System and Connectivity

The switching system of FIG. 1 illustrates a flow-zone network 100 that provides an example of a network environment within which aspects of the subject technology can be implemented. For illustration purposes, the network topology in shown in the form known generally as a modified Clos network or generalized fat-tree; the disclosure may be applied to this topology, and it is typical in some circumstances, such as in data centers. This figure is not intended to limit the disclosure to a particular topology but schematically illustrates an embodiment.

In FIG. 1, the circles and solid rectangles represent network elements, the dashed lines represent links over which data frames may be exchanged, and the dotted lines represent boundaries of units to be described. Data frames 218 (not shown in FIG. 1) are formatted in accordance with Layer 2 technology in this embodiment.

In FIG. 1, the circles at the bottom represent communicating stations, which we refer to here as "servers" as an indication that they may be computer servers in an embodiment. In this disclosure, we take the view that the servers 102 may be part of the network, rather than simply end stations that connect to the network. This is because a server 102 may be embodied in physical hardware that internally supports a multiplicity of communication processes, such as virtual servers. In this case, the server 102 may include switching functionality used to route data among the virtual servers and the flow-zone network 100. The data exchanged within server 102 and among servers 102 may be formatted in many possible formats. However, the data exchanged by server 102 with the flow-zone network 100 is, in an embodiment, in the form of Layer 2 data frames. Server 102 plays a key role in flow-zone network 100 by creating data frames in the proper format, and with the proper addresses and other frame fields, for injecting into flow-zone network 100.

The switching in the flow-zone network 100 occurs in a set of interconnected zones at various zone levels. In the example of FIG. 1, we have labeled the zone level of the servers 102 as "zone level 0".

The servers 102 are connected directly to switches that we identify as rack switches 106. The term "rack" is reflective of industry usage, since deployments typically involve a multiplicity of servers in a rack served by a switch, commonly known as a "Top of Rack" switch. In this example, the rack switches 106 are identified as "zone level 1". In typical deployments, the rack switch 106 would have no more than around 256 or 512 ports, though this is not a restriction on the disclosure.

In the flow-zone network 100, a group of rack switches 106 may be interconnected by a set of fabric switches 108. In typical deployments, the fabric switch 108 would have no more than around 256 or 512 ports, though this is not a restriction on the disclosure. As is typical in the generalized fat-tree network structure, redundant fabric switches 108 are provided, so that multiple routes exist between pairs of rack switches 106. As is typical in generalized fat-tree networks, the fabric switches 108 are organized in sets, with such a set supporting a group of rack switches 106, as shown in FIG. 1. The cluster of grouped switches and servers is known as a pod 110. In an embodiment, illustrated in FIG. 1, each fabric switch 108 in a pod 110 is directly connected to each rack switch 106 in that pod 110 but not directly to other fabric switches 108. In FIG. 1, pod 110 is illustrated with two fabric switches 108 and two rack switches 106. Zone level 2 can be considered associated with pod 110 as well as with fabric switches 108 in pod 110.

In the flow-zone network 100, a group of pods 110 may be interconnected by a set of spine switches 104. These are designated as zone level 3 switches. In the example, as shown in FIG. 1, zone level 3 is the highest level of the switching hierarchy. The level of redundancy in the interconnectivity via the spine switches depends on the implementation; the disclosure is not limited to the specific connectivity illustrated. In an embodiment, illustrated in FIG. 1, each spine switch 104 is directly connected to one fabric switch 108 in each pod 110.

The generalized fat-tree network structure is known in prior art. The detailed architectural topology discussed herein has been disclosed as the basis of a large data center deployment (e.g., Alexey Andreyev, "Introducing data center fabric, the next-generation Facebook data center network," Nov. 14, 2014). In that disclosed Facebook data center, a pod 110 includes 4 fabric switches 108 and 48 rack switches 106; each fabric switch 108 is interconnected to 48 spine switches 104.

The flow-zone network 100 allows servers to exchange data frames with other servers. Interconnections with external networks may also be supported. These could be, for example, via ports of fabric switches 108, as indicated in the cited Facebook publication. Customized pods 110 could be designated purely for external network interfaces. Such implementations may be supported in accordance with the disclosure.

Zone Identification

The disclosure makes use of zones and their identification. Zone identifiers serve to identify locations in the network topology.

The flow-zone network 100 of FIG. 1 is not a strictly tree-like hierarchy, but it does support a useful hierarchy of zone levels, as described above. This hierarchy can be usefully exploited.

In the flow-zone network 100 of FIG. 1, zone level 3 supports connectivity to all pods, racks, and servers. Each spine switch 104 is directly connected to one fabric switch 108 in each pod 110. Each spine switch 104 belongs to a spine identified by a spine identifier (ID) 118. A spine switch 104 directly connected to a fabric switch 108 in each pod 110 is part of a spine; moreover, that spine also includes every other spine switch 104 connecting to those same fabric switches 108. This is illustrated in the example of FIG. 1, in which the two spine switches 104 in the upper left are labeled with the spine ID 118 value "x" on the right side of the rectangle indicating the switch; both of these spine switches 104 belong to spine "x". Likewise, the two spine switches 104 in the upper right are labeled with the spine ID 118 value "y" on the right side of the rectangle indicating the switch; both of these spine switches 104 belong to spine "y". Each of the spine switches 104 within a spine is assigned a spine switch ID 122 that is unique within that spine. This is illustrated in the example of FIG. 1, in which the two spine switches 104 in spine "x" are shown with spine switch ID 122 values of "a" and "b" on the left side of the rectangle indicating the switch; likewise, the two spine switches 104 in spine "y" are also shown with spine switch ID 122 values of "a" and "b". Each spine switch 104 is uniquely identified by its spine ID 118 and spine switch ID 122. Each spine switch 104 stores internally a record of the value of its spine ID 118 and spine switch ID 122.

In the flow-zone network 100 of FIG. 1, zone level 2 is the pod level. Each server 102 is included in one and only one pod 110. In order to identify the location of server 102 within the topology, the identity of its pod 110 must be known. In support of this purpose, each pod 110 is identified with a pod ID 112, unique among the pods 110 in flow-zone network 100. In the example of FIG. 1, the two pods 110 are identified with the values "a" and "b", respectively, of pod ID 112. In the example, each fabric switch 108 is part of one and only one pod 110 and can then be associated with the corresponding pod ID 112; each fabric switch 108 stores internally a record of the value of its pod ID 112. This is illustrated in the example of FIG. 1, using the pod ID 112 values "a" and "b" labeling each fabric switch 108 on the left side of the rectangle indicating the switch.

Each fabric switch 108 stores, in addition to a pod ID 112, a separate spine ID 118. This spine ID 118 serves to distinguish the fabric switch 108 on the basis of the spine to which it is attached and belongs. The spine ID 118, equal to the spine ID 118 value of the spine to which the fabric switch 108 is attached, is stored within fabric switch 108. This is illustrated in the example of FIG. 1, in which the fabric switches 108 in spine "x" (and interconnected with spine switches 104 with spine ID 118 values of "x") are shown with spine ID 118 values of "x" on the right side of the rectangle indicating the switch; likewise, two fabric switches 108 in spine "y" (and interconnected with spine switches 104 with spine ID 118 values of "y") are shown with spine ID 118 values of "y".

In the flow-zone network 100 of FIG. 1, zone level 1 is the rack level. Each server 102 is directly connected to one and only one rack switch 106. In order to identify the location of server 102 within the topology, the identity of its rack switch 106 must be known. In support of this purpose, each rack switch 106 is identified with a rack ID 114. In the example of FIG. 1, the two rack switches 106 in pod "a" are identified, as shown on the right side of the rectangle indicating the switch, with the values "a" and "b", respectively, of rack ID 114. The namespace associated with the rack ID 114 is local to pod 110 and can, without ambiguity, overlap the namespace associated with the pod ID 112; for example, there is no confusion in using the names "a" and "b" for the rack switches 106 even though "a" and "b" are used to identify the pods 110. Likewise, the namespace can unambiguously be used for the identification of racks within other pods 110; in other words, pod "a" and pod "b" can both include rack "a" and rack "b", as shown in FIG. 1. The naming is unambiguous because, for example, rack "a" of pod "a" is distinguished from rack "b" of pod "a" and from rack "a" of pod "b". Each rack switch 106 stores internally a record of the value of its pod ID 112 (indicated on the left side of the rectangle indicating the switch) and its rack ID 114.

In the flow-zone network 100 of FIG. 1, zone level 0 is the server level. In order to identify the server 102 within the topology, each server 102 is identified with a server ID 116. Again, the namespaces are local, so the values of server ID 116 of server 102 attached to a given rack switch 106 can unambiguously overlap those of another rack. Each server 102 stores internally a record of the value of its server ID 116, as well as its pod ID 112 and rack ID 114, which are equivalent to those stored in the rack switch 106 to which it is directly connected.

With this identification system, each server 102 is unambiguously identified by its pod ID 112 (at zone level 2), its rack ID 114 (at zone level 1), and its server ID 116 (at zone level 0). Each rack switch 106 is unambiguously identified by its pod ID 112 (at zone level 2) and its rack ID 114 (at zone level 1). Each fabric switch 108 is unambiguously identified by its pod ID 112 (at zone level 2) and its spine ID 118 (at zone level 3). Each spine switch 104 (at zone level 3) is unambiguously identified by its spine ID 118 and its spine switch ID 104>.

A hierarchical or quasi-hierarchical identification system is a common to many switching network architectures, including pure tree structures, regardless of the detailed connectivity and the number of hierarchical levels. This disclosure applies generally to such network structure, though the embodiment illustrated is simplified for explanatory purposes.

Flow-Zone Switch

Figure 2:
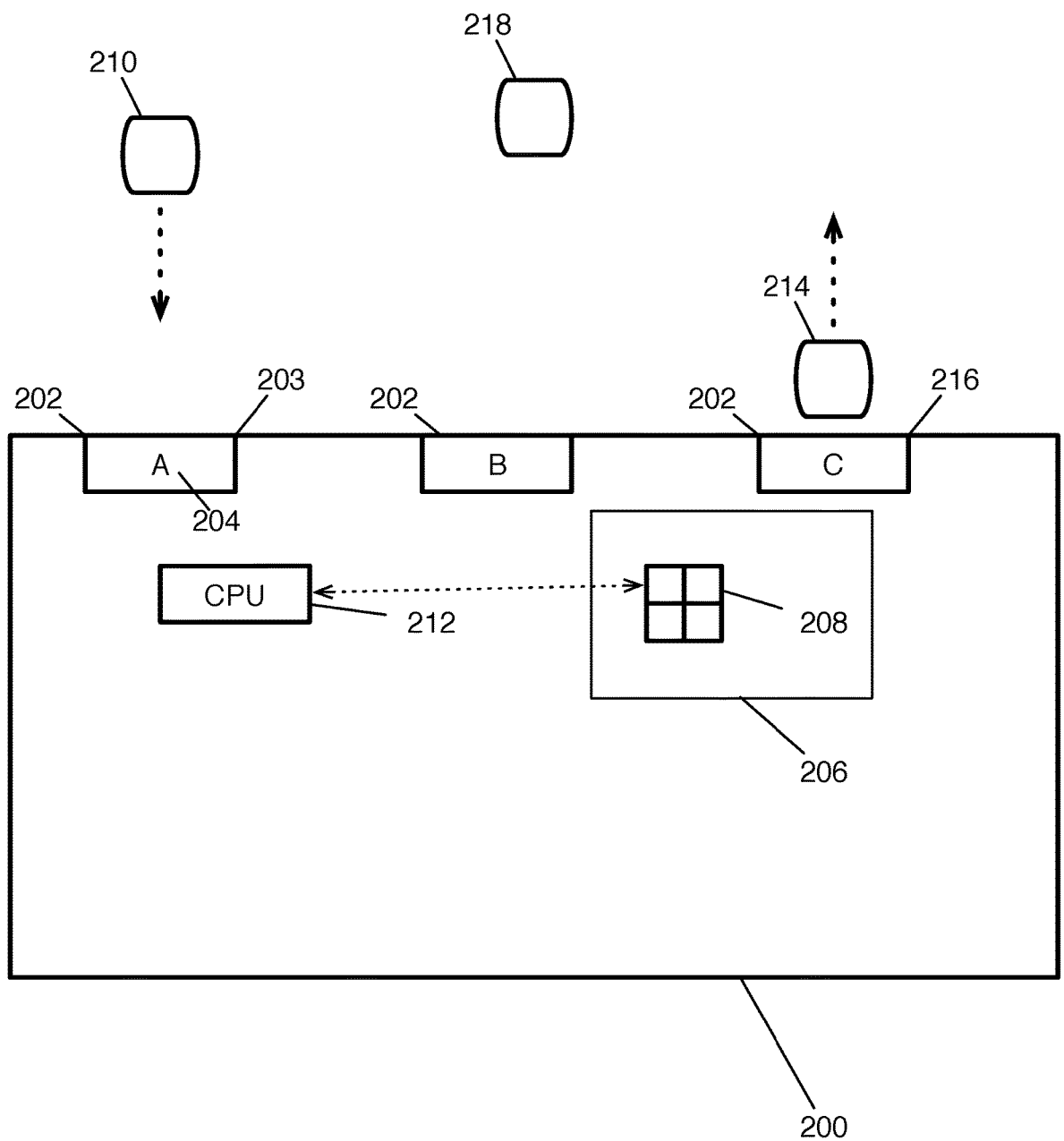
FIG. 2 illustrates an embodiment of a flow-zone switch.

An embodiment of a flow-zone switch 200 useful in illustrating this disclosure is shown in FIG. 2. Flow-zone switch 200 represents rack switch 106, fabric switch 108, or spine switch 104. Flow-zone switch 200 is provided with a plurality of ports 202, three of which are indicated in the example of FIG. 2, each of which is associated with a port identifier (port ID) 204. The flow-zone switch 200 forwards Layer 2 data frames (referred to here simply as frames 218). In the embodiment, the ports are enabled to receive ingress frames 210 and transmit egress frames 214. The ports may connect to wires, optical cables, radios, or any other form capable of data reception and transmission. The ports may be virtual.

Flow-zone switch 200 is provided with memory 206 within the switch, and with flow-zone database 208, stored in memory 206. Memory 206 may be embodied in various combinations of electronic memory, physical storage, and another other means of storing information and may be distributed among these.

When flow-zone switch 200 receives a frame (ingress frame 210) at a particular port 202, that port 202 is the ingress port 203 of ingress frame 210.

Flow-zone switch 200 is provided with processing unit (CPU 212), enabled to read data from flow-zone database 208 as selected using database operations as such conventional relational database operations. CPU 212 may also be enabled to write data to flow-zone database 208. CPU 212 may be distributed among various processing components and may include, for example, the ability to assign frames to queues in memory 206 based on frame properties, and the ability to schedule the processing of frames in queues.

CPU 212 is enabled to read ingress frame 210 along with the associated port ID 204 of its ingress port 203. CPU 212 is enabled to parse ingress frame 210 and determine the content of fields therein. Based on those fields of ingress frame 210, and possibly considering also associated port ID 204, CPU 212 is enabled to refer to flow-zone database 208 in determining zero or more egress frames 214 and selecting zero or more egress ports 216 for each such egress frame 214, and to forward the determined egress frames 214 to their selected egress ports 216. CPU 212 may also be enabled to update flow-zone database 208 according to information obtained from the receipt of ingress frame 210 and accompanying information.

In some embodiments, CPU 212 is enabled to exchange control and configuration information by exchanging switch frames with other flow-zone switches 200 and servers 102 in flow-zone network 100, storing such information in memory 206.

Server

Figure 3:
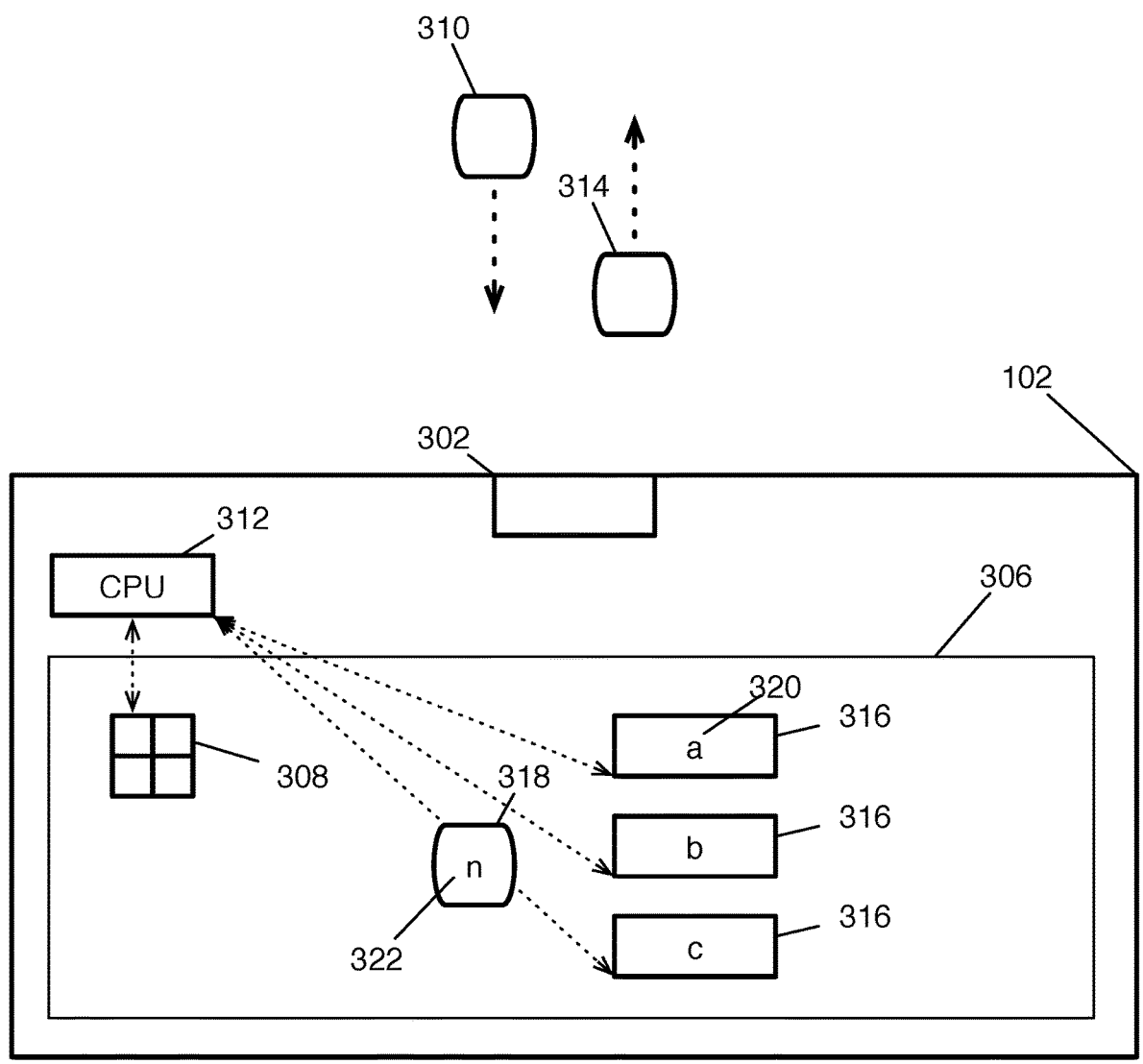
FIG. 3 illustrates an embodiment of a server.

In this disclosure, server 102 is not considered a flow-zone switch 200, although, as shown in FIG. 3, it may incorporate a switch and includes some of the attributes of a flow-zone switch 200.

An embodiment of a server 102 useful in illustrating this disclosure includes only a single port 302. The principles of the disclosure are applicable to a physical server 102 with multiple ports 302.

Server 102 is provided with internal memory 306 and with flow-zone database 308, stored in memory 306. Internal memory 306 may be embodied in various combinations of electronic memory, physical storage, and another other means of storing information and may be distributed among these.

Server 102 is provided with CPU 312, which is enabled to read data from flow-zone database 308 as selected using database operations as such conventional relational database operations. CPU 312 may also be enabled to write data to flow-zone database 308. CPU 312 may be distributed among various processing components and may include, for example, the ability to assign frames to queues in memory 306 based on frame properties, and the ability to schedule the processing of frames in queues.

Server 102 may be provided with one or more virtual machines (VMs) 316. Virtual machines may be resident in memory 306 and may represent data organized into various formats, including instructions to be carried out by CPU 312. In this description of the internal server structure, the term "VM" is used to represent a process of the server to which network data may be directed and from which it may be sourced; the VM need not be a "virtual machine" in any technical sense of the term. VM 316 is uniquely identified within server 102 by VM ID 320, stored in memory 306 and associated with the VM 316 that it identifies.

CPU 312 is enabled to receive a data unit 318 from VM 316, accompanied by the value of VM ID 320 of that VM 316. CPU 312 is enabled to forward a data unit 318 to a VM 316 as specified by the VM ID 320 of that VM 316.

Data unit 318 may be a Layer 2 data frame, a Layer 3 data packet, a Layer 4 data segment, or some other unit of data.

CPU 312 is enabled to read ingress frame 310 (which may be in the same format as that of frame 218) following its receipt at port 302. CPU 312 is enabled to parse ingress frame 310 and determine the content of fields therein. Based on those fields of ingress frame 310, CPU 212 is enabled to refer to flow-zone database 308 in determining zero or more data units 318 and selecting zero or more VMs 316 (identified by VM ID 320) to which to forward those data units 318. CPU 212 may also be enabled to update flow-zone database 308 according to information obtained from the receipt of ingress frame 310 and accompanying information.

CPU 312 is enabled to receive a data unit 318 from VM 316, accompanied by the value of VM ID 320 of that VM 316, to parse data unit 318 and determine the content of fields therein, to, based on those fields, refer to flow-zone database 308 in determining zero or more egress frames 314 (which may be in the same format as that of frame 218) and forwarding those egress frames 314 to port 302 for transmission. CPU 212 may also be enabled to update flow-zone database 308 according to information obtained from the receipt of data unit 318 and accompanying information.

In some embodiments, CPU 312 is enabled to exchange control and configuration information by exchanging switch frames with other servers 102 and flow-zone switches 200 in flow-zone network 100, storing such information in memory 306.

Flow-Zone Frames and Addresses

Frame 218 comprises various fields. As an exemplary embodiment, the format of frame 218 may be identical or similar to that of a conventional Ethernet frame, as shown in FIG. 4. The Ethernet frame of FIG. 4 comprises a six-byte (48-bit) destination address field (DA 402), a six-byte source address field (SA 404), a two-byte EtherType field 406, a data field 408, and a four-byte frame-check sequence field (FCS 410).

In Layer 2 networks, the Layer 2 address should uniquely identify a device that serves as the source or destination of frame 218. The SA 404 indicates the source of frame 218. The DA 402 indicates the destination of frame 218. Flow-zone network 100 forwards frames from source to destination, in some cases via flow-zone switch 200. A flow-zone switch 200 that forwards frame 218 on its route from source to destination is neither the source nor the destination of that frame 218.

In conventional Layer 2 data networks, such as IEEE 802 networks, one particular bit in the Layer 2 address identifies that address as either a global address or a local address. Global addresses are expected to be universal and are therefore generally permanently assigned ("burned in") to the hardware in the manufacturing phase. It may impossible to change or assign such an address within the scope of the standards (other than possibly to toggle a single bit to indicate unicast or multicast). It is therefore impossible to organize global addresses into a structure that could be interpreted during network switching and frame delivery. The address structure is non-hierarchical and "flat."

The local address space, which is the space of addresses in which the "local" bit is set on, is not subject to universal uniqueness, and addresses need not be permanently assigned to devices. Therefore, opportunities exist to exploit the space, creating structure to aid in switching mechanisms and frame delivery. For the purpose of the embodiment herein, DA 402 of frame 218 exchanged in flow-zone network 100 is presumed to be of the local variety. In other embodiments, frames 218 with DA 402 of the global variety may be exchanged, identified as global by flow-zone switch 200 by detection of the global bit in DA 402, and forwarded using routing methods appropriate to global addressing, which may be applied as well to unique local addresses.

In flow-zone switching, like conventional Layer 2 switching, forwarding is done on the basis of DA 402. However, unlike conventional Layer 2 switching, forwarding instructions are embedded in the DA 402, eliminating or nearly eliminating the need for a lookup table in the switch. To enable flow-zone switching, device addresses are constructed so as to enable each switch to make a good forwarding decision toward the device by reading the DA 402 of a frame destined for that device. For this reason, device addresses are constructed in accordance with the topology of the network and the device's location within the topology.

In flow-zone switching, frame 218 may be a data frame or a switch frame. The destination of a data frame is a data process, such as a VM 316, within a server 102, with the understanding that data frames destined for outside the flow-zone network 100 will be directed through an interface similar to that of a server 102. The destination of a switch frame is any flow-zone switch 200 or to a control process within a server 102.

Zero or more unique Layer 2 addresses are assigned to each data process, such as a VM 316, within server 102; these are used in the exchange of data frames among the VM 316 and are formatted accordingly. In addition, zero or more Layer 2 addresses are assigned to each flow-zone switch 200 and to the control process within each server 102; these are used in the exchange of switch frames and formatted accordingly, with a format that may be different from that of a data frame. As can be understood from a review of FIG. 1, the optimal routing of a data frame to a server 102 is fundamentally different from the routing of a switch frame to a switch that is not a server 102. As a result, the optimal data frame format is different from the optimal switch frame format. An advantage of flow-zone switching is that separate routing methods can easily coexist, based on separate frame address formats. This can, for example, provide entirely different routing methods for data frames and switch frames.

Data Plane Flow-Zone Addresses

Figure 5:
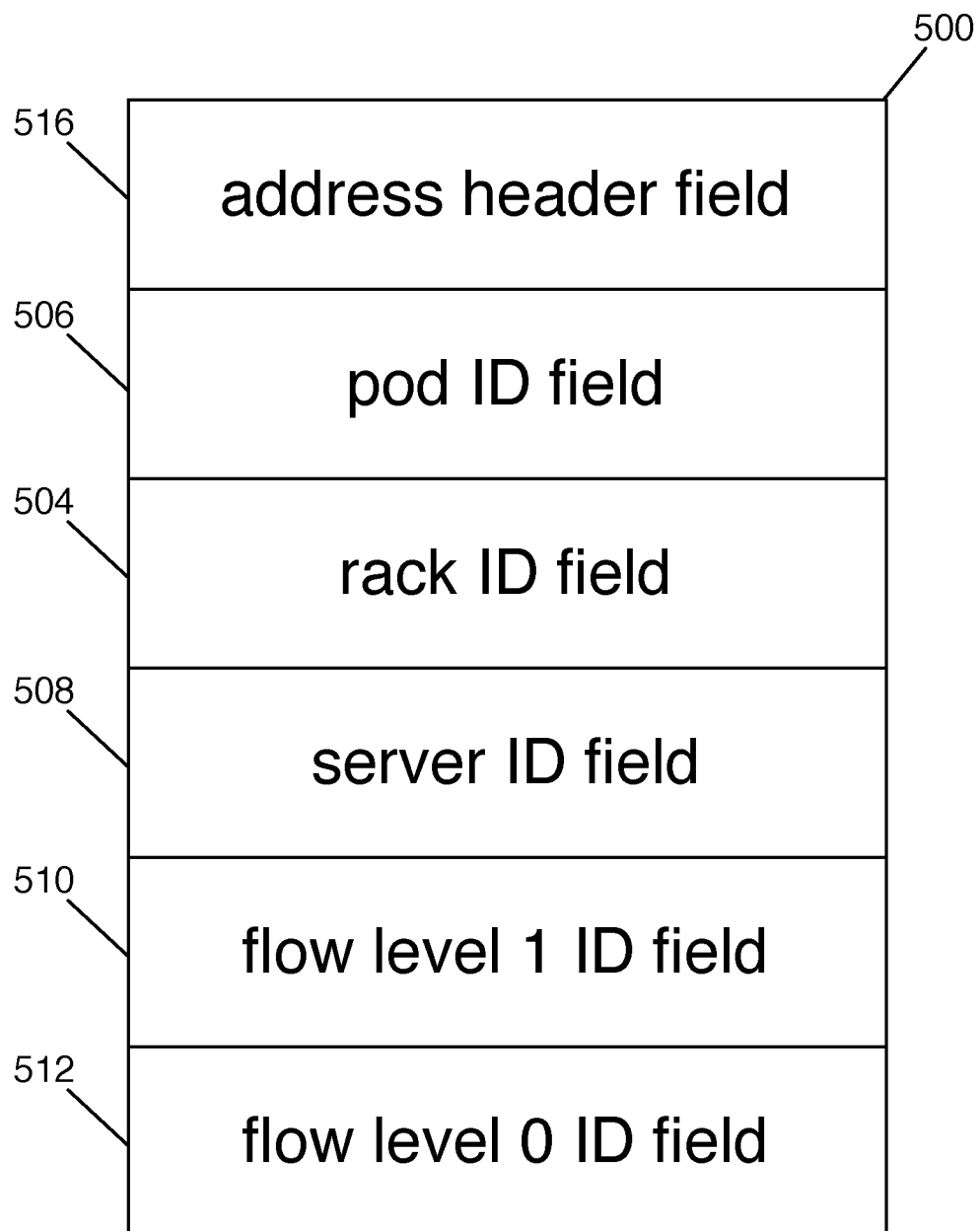
FIG. 5 illustrates a possible embodiment of a data-frame flow-zone address.

For data frames in flow-zone format, the DA 402 and SA 404 are data-frame flow-zone addresses 500, also known as data plane flow-zone addresses. One format of the data-frame flow-zone address 500 is illustrated in FIG. 5. The figure shows the data-frame flow-zone address 500 formatted to include six fields, each 1 byte in length. This example is convenient for illustration and may be convenient in practice as well, especially since the most common Ethernet address is six bytes. However, the disclosure is not limited regarding the specific number of fields or their length.

In the example of FIG. 5, the data-frame flow-zone address 500 is indicated as six one-byte fields, the first of which is address header field 516. According to standard Ethernet format, the two least-significant bits of the first byte of an address are standardized: Bit 0 of the byte indicates whether the address is multicast, and Bit 1 of the byte indicates whether it is global. A recent standard, IEEE Std 802c-2017, amends IEEE Std 802 and specifies at least the first four least-significant bits of the first byte of a local address. The use of the first byte for address header field 516 allows the address to accommodate standard requirements, and perhaps to also convey additional information regarding the format of the address or other aspects of the data frame. In nonstandard applications, this additional byte could be used for other purposes.

Each of the remaining five bytes of the data-frame flow-zone address 500, as shown in FIG. 5, represents an identifier in the hierarchy of flow-zone network 100 from the perspective of server 102, including hierarchy within the server 102. One such field is assigned to each zone level. Pod ID field 506 holds the zone level 2 identifier (pod ID 112 of pod 110). Rack ID field 504 holds the zone level 1 identifier (rack ID 114 of rack switch 106). Server ID field 508 holds the zone level 0 identifier (server ID 116 of the server 102).

The last two fields of data-frame flow-zone address 500 are flow level fields, as further detailed below. The flow level fields may be used to distinguish among the data-frame flow-zone addresses 500 assigned to a server 102. In general, these may represent data flows to or from server 102. While FIG. 5 shows two flow level fields (flow level 1 ID field 510 and flow level 0 ID field 512), embodiments may use zero, one, or more flow level fields. In an embodiment illustrated below, flow level 1 ID field 510 holds the identifier VM ID 320 of a virtual machine (VM 316) installed on server 102.

The choice of one byte for each of the level ID fields means that each level is limited to $2^8=256$ level identifiers. In other words, that choice supports 256 servers per rack, 256 racks per pod, and 256 pods in the flow-zone network 100, which limits the flow-zone network 100 to on the order of 16 million servers. Each server supports 256 level 1 flow IDs, which, in an embodiment, represents a limit of 256 VMs per server. This provides a limit of 256 level 0 flow IDs per VM. If some of these limits are overly restrictive for a requirement, the data-frame flow-zone address 500 can be reapportioned among the fields accordingly. Given the assumptions, and considering that some of the identifiers may be reserved for special purposes such as switch frames, the network could support over a billion VMs. Yet, even in such a vast network, routing is achieved easily and efficiently with flow-zone switching, as described below.

Figure 6:
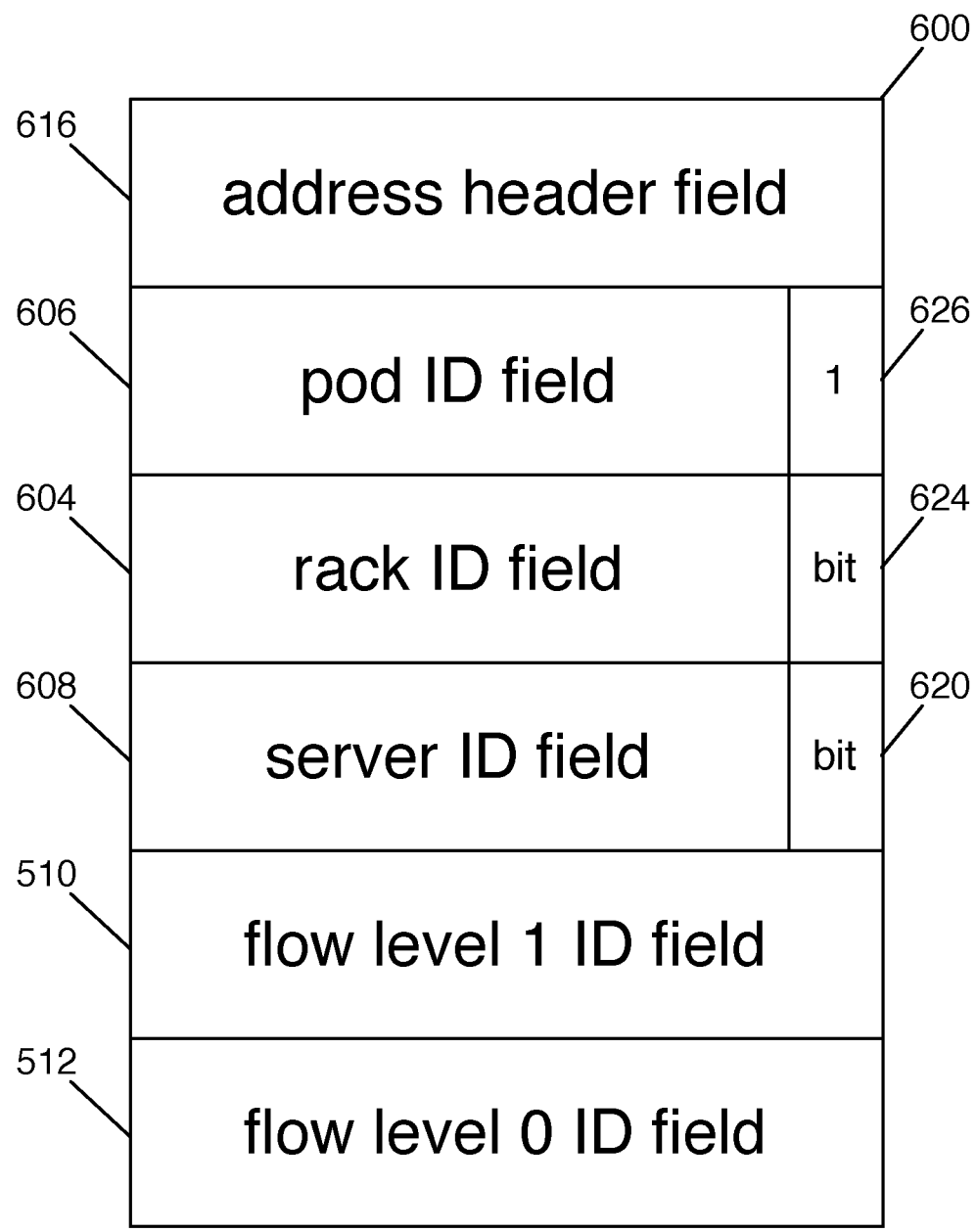
FIG. 6 illustrates an embodiment of a data-frame flow-zone address.

In some embodiments, this scale is more vast than necessary. With smaller deployments, the address fields can be dimensioned accordingly smaller. FIG. 6, illustrates one way to make more efficient representation of data-frame flow-zone address 600, with reduced scale. In the example of FIG. 6, the least significant bit of the byte containing the pod, rack, and server ID fields is designated for other uses. In this case, pod ID field 606 holds the seven-bit pod ID 112, rack ID field 604 holds the seven-bit rack ID 114, and server ID field 608 holds the seven-bit server ID 116. This allows 128 servers per rack, 128 racks per pod, and 128 pods, which supports more than two million servers. Below, we generally presume this partitioning of the address, although other embodiments support other partitioning.

The bits not assigned for pod, rack, and server identification are available for other purposes. FIG. 6 illustrates these three bits as first info bit 624, second info bit 620, and data plane format bit 626. As shown below, these information (info) bits are available for purposes such as identifying the address format. As shown in the FIG. 6, data plane format bit 626 is set to the value 1 as an indicator that the address is a data frame flow-zone address 500. As discussed below, data plane format bit 626 can also be set to the value 0, which indicates that the address is formatted as a switch frame flow-zone address rather than in the format of data-frame flow-zone address 600.

We refer to data plane format bit 626, first info bit 624, and second info bit 620 collectively as the format indicator. When data plane format bit 626 is set to 0, first info bit 624 and second info bit 620 indicate the zone level to which the address refers. When data plane format bit 626 is set to 1, the address refers to a data frame flow-zone address 500 at zone level 0.

Control Plane Flow-Zone Addresses

As discussed earlier, the flow-zone network 100 supports not only data frames but also switch frames, also known as control frames. In both cases, particular flow-zone address formats are used. The format of data frame flow-zone addresses has been discussed above.

For switch frames in flow-zone format, the DA 402 and SA 404 are switch flow-zone addresses, also known as control plane flow-zone addresses.

Switch flow-zone addresses are readily distinguished from data flow-zone addresses by the value data plane format bit 626, which is set to 0 for the former and to 1 for the latter. In order to provide a distinguishing function, data plane format bit 626 is in the same bit position for data flow-zone addresses as for switch flow-zone addresses.

The format of the switch flow-zone address depends on the zone level of the switch. Four types of switch flow-zone address are specified, one for each type of switch. The four types are readily distinguished by the value of the format indicator; i.e., the values of the first info bit 624 and the second info bit 620. Each type is associated with a different combination of those two bits, which are in the same bit position for all switch flow-zone addresses. For convenience, those bit positions also match those of data flow-zone addresses.

Figure 7B:
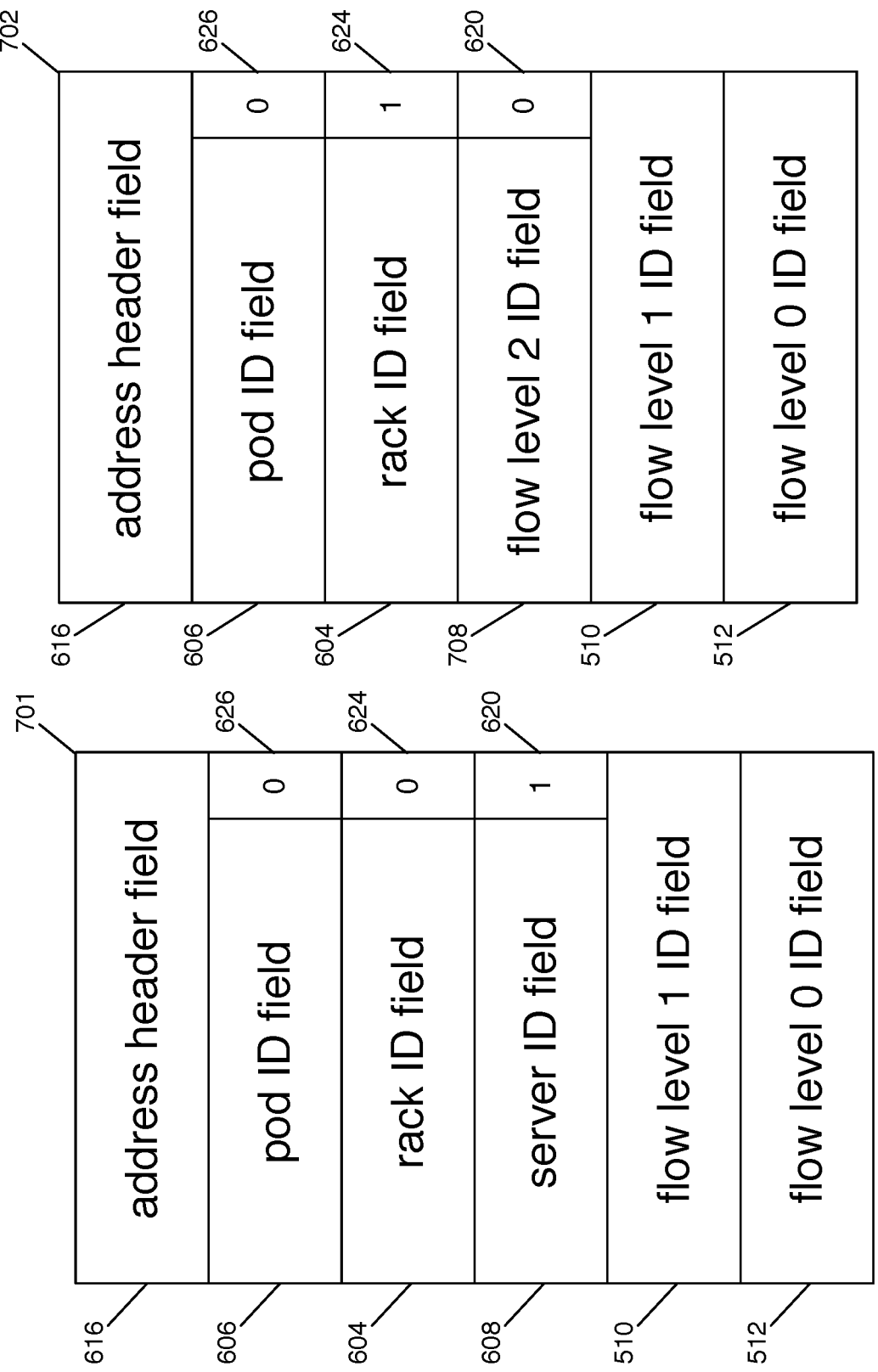
FIG. 7b illustrates an embodiment of a rack flow-zone address.
Figure 7A:
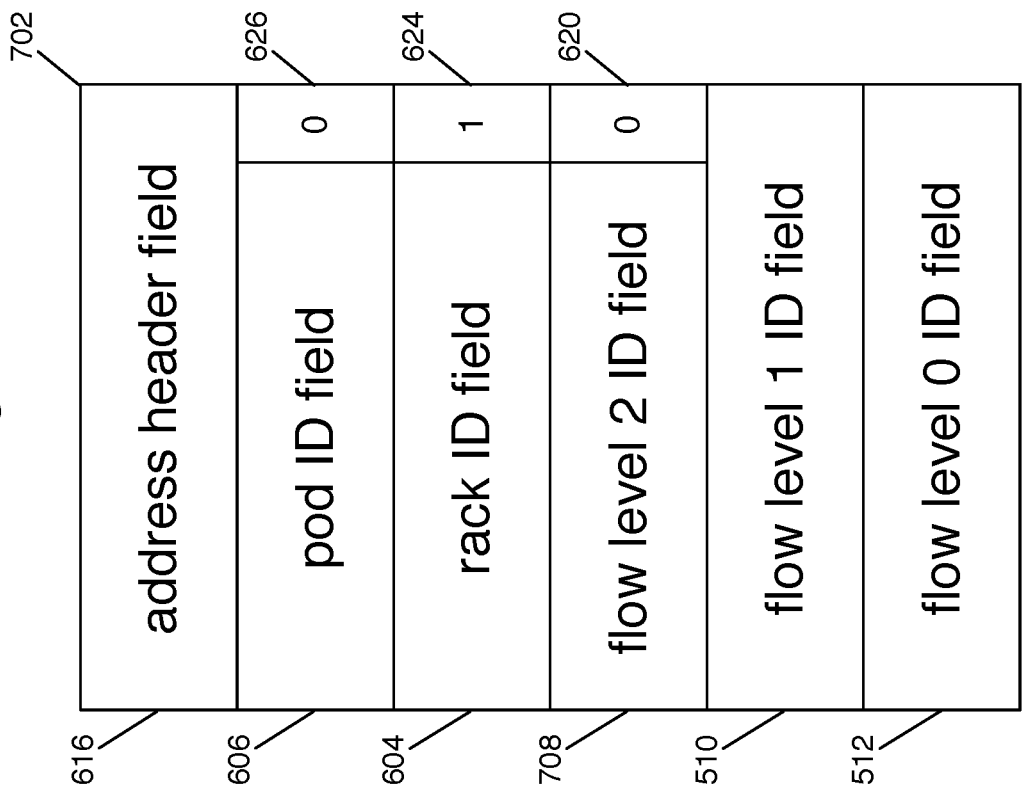
FIG. 7a illustrates an embodiment of a server flow-zone address.

FIG. 7a shows an embodiment of a server switch flow-zone address 701, which is the address of a control process at a server 102 indicated by the address fields. The format of the address is similar to that of a data flow-zone address, except that data plane format bit 626 is set to zero. The first info bit 624 and the second info bit 620 are set to 0 and 1, respectively.

FIG. 7b shows an embodiment of a rack switch flow-zone address 702, which is the address of a control process at a rack switch 106 indicated by the address fields. The format of the address is similar to that of a server switch flow-zone address 701, except that first info bit 624 and second info bit 620 are set to 1 and 0, respectively. Also, in this case, no server specification is necessary to describe the switch location, so no address space needs to be allocated for specifying the server ID 116. In this case, the seven bits available in the fourth byte of the address are allocated as flow level 2 ID field 708, a field available for flexible use.

FIG. 8 shows an embodiment of a fabric switch flow-zone address 801, which is the address of a control process at a fabric switch 108 indicated by the address fields. The format of the address is similar to that of a rack switch flow-zone address 702, but first info bit 624 and second info bit 620 are set to 0 and 0, respectively. Also, in this case, no rack specification is necessary to describe the switch location; however, the spine ID 118 is required in order to identify the particular fabric switch 108 within the identified pod 112. Therefore, in this case, the seven bits available in the third byte of the address are allocated as spine ID field 804 to identify that spine ID 118.

Figure 9:
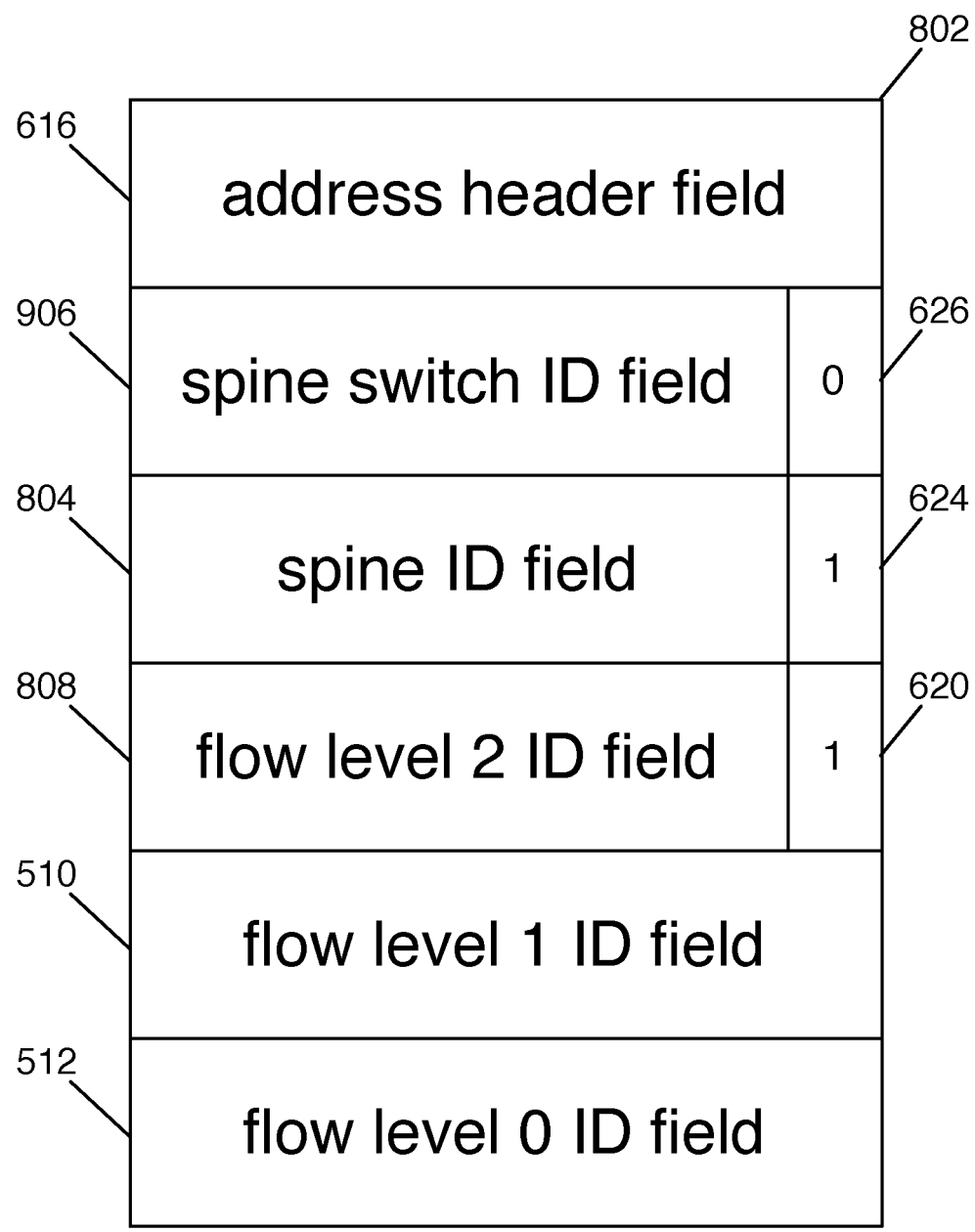
FIG. 9 illustrates an embodiment of a spine switch flow-zone address.

FIG. 9 shows an embodiment of a spine switch flow-zone address 802, which is the address of a control process at a spine switch 104 indicated by the address fields. The address format is similar to that of a fabric switch flow-zone address 801, but first info bit 624 and second info bit 620 are set to 1 and 1, respectively. In this case, no pod specification is necessary to describe the switch location; however, the spine switch ID 122 is required in order to identify the particular spine switch 104 within the identified spine. Therefore, in this case, the seven bits available in the second byte of the address are allocated as spine switch ID field 906 to identify that spine switch ID 122.

The use of these control-frame formats in forwarding will become clear in the following sections.

Frame Forwarding

Frame forwarding is described, in the following sections, at each zone level of the hierarchy, beginning with zone level 0.

Frame forwarding decisions presented below are coordinated by a CPU (CPU 212 or CPU 312) may involve multiple queues and procedures to assign frames to queues. Such queuing assignments and procedures are not specified here but may take advantage of information coded into the fields of frames DA 402 and SA 404.

Frame Forwarding at Zone Level 0

Figure 10:
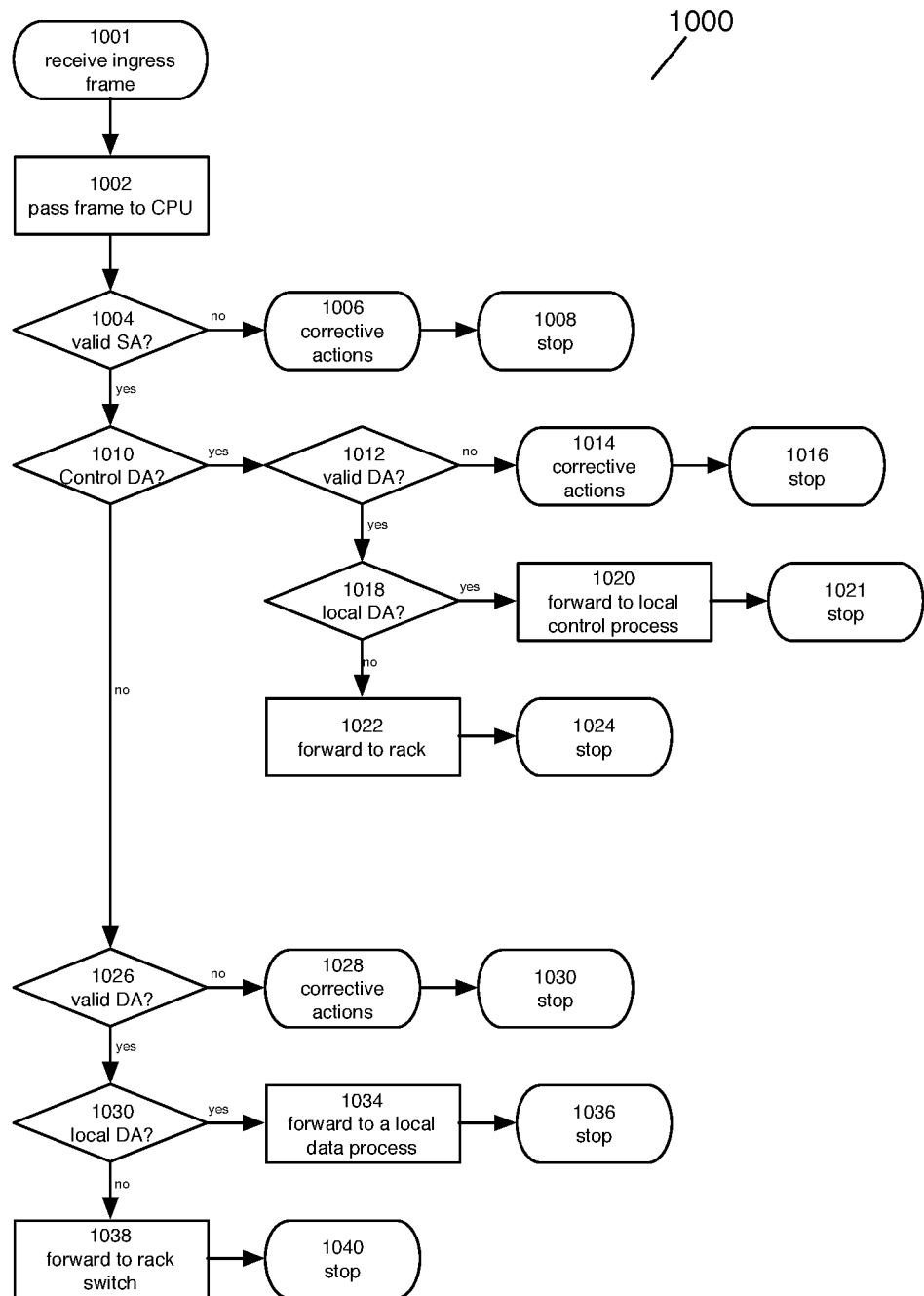
FIG. 10 illustrates server forwarding procedure 1000.

The server forwarding procedure 1000 at server 102 is illustrated in the flow chart of FIG. 10.

The server 102 receives ingress frame 310, either via port 302 or from a VM 316, in Step 1001 and passes the frame to its CPU 312 in Step 1002. The remaining steps are executed by CPU 312.

In Step 1004, the frame SA 404 may be checked for validity. If the result is negative, then corrective actions may be taken in Step 1006, after which server forwarding procedure 1000 terminates at Step 1008.

If the result of Step 1004 is affirmative, then data plane format bit 626 of DA 402 is checked in Step 1010. If the value of that bit is 0, then DA 402 indicates a control plane format, and the procedure continues to Step 1012, in which DA 402 may be checked for validity. If the result is negative, then corrective actions may be taken in Step 1014, after which server forwarding procedure 1000 terminates at Step 1016.

If the result of Step 1012 is affirmative, then DA 402 is examined in Step 1018 to determine whether the destination is local; in other words, whether the destination control process is one on the server executing Procedure 1000. In more detail, Step 1018 may involve checking that all of the following are true regarding DA 402: first info bit 624 is 0, second info bit 620 is 1, pod ID field 606 holds the local pod ID 112, rack ID field 604 holds the local rack ID 114, and server ID field 608 holds the local server ID 116. If so, then the result of Step 1018 is affirmative, the frame is passed to the local control process in Step 1020, and rack forwarding procedure 1100 terminates at Step 1021.

If the result of Step 1018 is negative, then, in Step 1022, the (possibly modified) frame is forwarded to attached rack switch 106 via port 302 as egress frame 314, after which rack forwarding procedure 1100 terminates at Step 1024.

If the result of Step 1010 is negative, then DA 402 indicates a data plane format and the address is a data-frame flow-zone address 600. In that case, the procedure continues to Step 1026, in which DA 402 may be checked for validity. If the result is negative, then corrective actions may be taken in Step 1028, after which server forwarding procedure 1000 terminates at Step 1030.

If the result of Step 1026 is affirmative, then DA 402 is examined to determine whether the destination is local; in other words, whether the destination data process is one on the server executing Procedure 1000. In more detail, Step 1030 may involve checking that all of the following a true regarding DA 402: pod ID field 606 holds the local pod ID 112, rack ID field 604 holds the local rack ID 114, and server ID field 608 holds the local server ID 116. If so, then the result of Step 1030 is affirmative, and the frame is passed to a local data process in Step 1034. The specific local data process may be selected on the basis of elements of the frame, such as flow level 1 ID field 510 and flow level 0 ID field 512 of DA 402. Subsequently, server forwarding procedure 1000 terminates at Step 1036.

If the result of Step 1030 is negative, then the destination is non-local and the (possibly modified) frame is forwarded to attached rack switch 106 via port 302 as egress frame 314, after which rack forwarding procedure 1100 terminates at Step 1040.

In some embodiments, server forwarding procedure 1000 is executed more compactly. For example, Steps 1012 and 1026 (and their resulting steps) are similar and could be combined. However, in some embodiments, the categorization of frames as either data plane or control plane is made early; for example, so that control frames can be placed into a higher-priority queue for further analysis and processing.

Frame Forwarding at Zone Level 1

Figure 11:
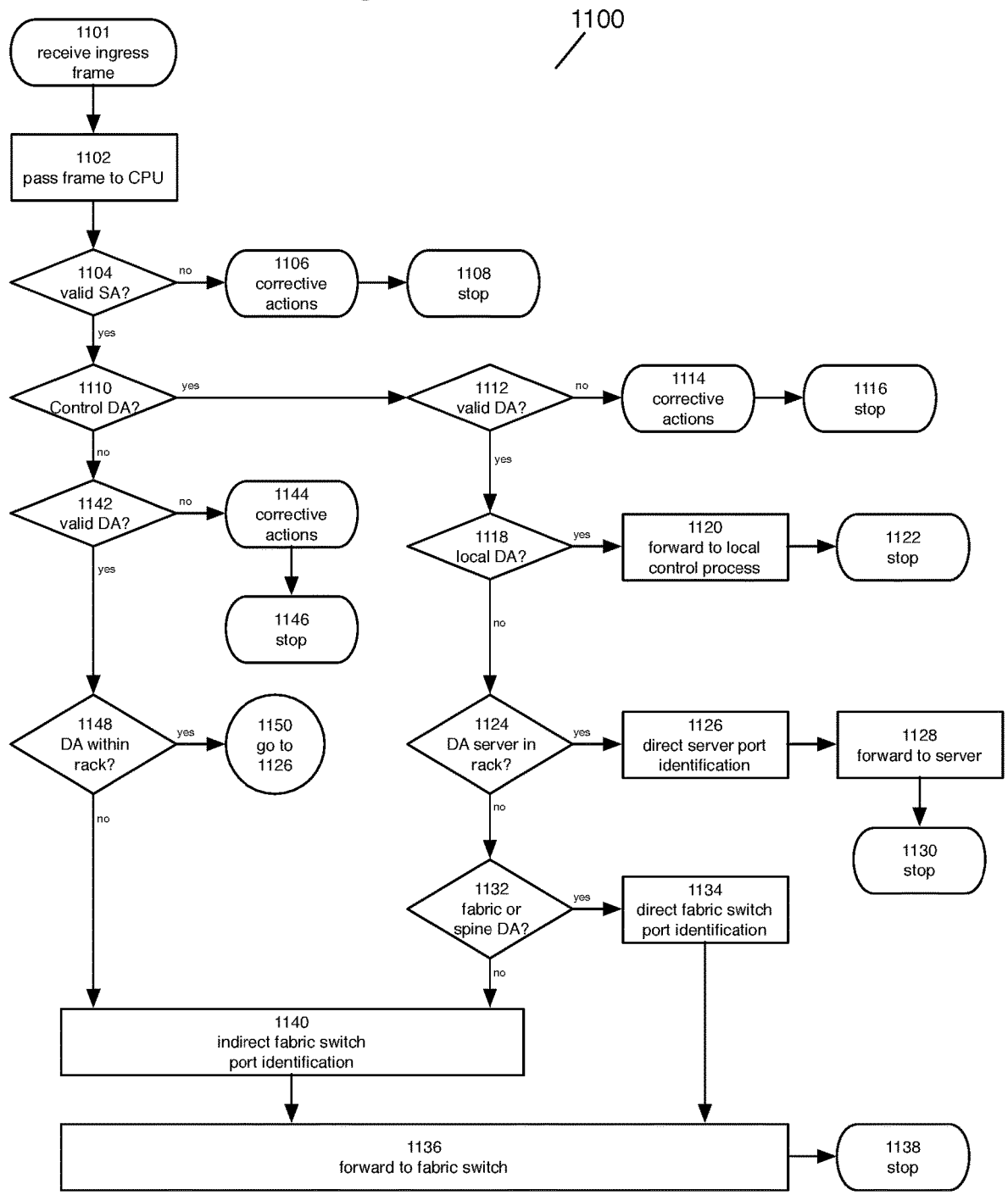
FIG. 11 illustrates rack forwarding procedure 1100.

The rack forwarding procedure 1110 at rack switch 106 is illustrated in the flow chart of FIG. 11.

The rack switch 106 receives ingress frame 210 via ingress port 203 in Step 1101 and passes the frame to its CPU 212 in Step 1102. The remaining steps are executed by CPU 212.

In Step 1104, the frame SA 404 may be checked for validity. If the result is negative, then corrective actions may be taken in Step 1106, after which rack forwarding procedure 1100 terminates at Step 1108.

If the result of Step 1104 is affirmative, then (in Step 1110) data plane format bit 626 of DA 402 is checked. If the value of that bit is 0, then DA 402 indicates a control plane format, and the procedure continues to Step 1112, in which DA 402 may be checked for validity. If the result is negative, then corrective actions may be taken in Step 1114, after which rack forwarding procedure 1100 terminates at Step 1116.

If the result of Step 1112 is affirmative, then DA 402 is examined in Step 1118 to determine whether the destination is local; in other words, whether the destination control process is one on the switch executing Procedure 1100. In more detail, Step 1118 may involve checking that all of the following a true regarding DA 402: first info bit 624 is 1, second info bit 620 is 0, pod ID field 606 holds the local pod ID 112, and rack ID field 604 holds the local rack ID 114. If so, then the result of Step 1118 is affirmative, the frame is passed to the local control process in Step 1120, and rack forwarding procedure 1100 terminates at Step 1122.

If the result of Step 1118 is negative, then the destination is determined to be non-local and Step 1124 determines whether the destination is a neighboring server 102 attached directly to the local rack switch 106. In more detail, Step 1124 may involve checking that all of the following a true regarding DA 402: first info bit 624 is 0, second info bit 620 is 1, pod ID field 606 holds the local pod ID 112, and rack ID field 604 holds the local rack ID 114. If so, then the result of Step 1124 is affirmative and direct server port identification of Step 1126 is executed. In Step 1126, the value of server ID 116 in the server ID field 608 of the DA 402 is used to identify the particular port ID 204 of the local port 202 matching that server ID 116 value. Depending on the embodiment, the identification can be obtained by inspection or by lookup in flow-zone database 208. In Step 1128, the (possibly modified) frame is forwarded as egress frame 214 to attached server 102 via the egress port 216 with the identified port ID 204, after which rack forwarding procedure 1100 terminates at Step 1130.

If the result of Step 1124 is negative, then the destination is determined to be outside the domain of the local rack and the frame will be forwarded to a fabric switch 108. The various connected fabric switches 108 are differentiated by their spine ID 118. In some cases, the particular spine ID 118 is specified directly by the frame. In particular, if DA 402 is in either the fabric switch flow-zone address 801 format of FIG. 8 or the spine switch flow-zone address 802 format of FIG. 9, then the DA 402 specifies spine ID 118 in spine ID field 804. These two control plane address formats are distinguished by the fact that first info bit 624 and second info bit 620 are identical. Therefore, in Step 1132, the bits of DA 402 corresponding to the bit positions of first info bit 624 and second info bit 620 are compared; if they match, then direct fabric switch port identification is executed in Step 1134. In Step 1134, the content of spine ID field 804 of DA 402 is identified as the specified spine ID 118 of the fabric switch 108 to which the frame should be forwarded. Step 1134 proceeds to use that value of spine ID 118 to identify the particular port ID 204 of the local port 202 matching that spine ID 118 value. Depending on the embodiment, the identification can be obtained by inspection or by lookup in flow-zone database 208.

In Step 1136, the (possibly modified) frame is forwarded as egress frame 214 to attached fabric switch 108 via the egress port 216 of the identified port ID 204, after which rack forwarding procedure 1100 terminates at Step 1138.

If the result of Step 1132 is negative, then DA 402 is identifiable as outside the local rack and in either the server flow-zone address 701 format of FIG. 7a or the rack flow-zone address 702 format of FIG. 7b. In either case, the fabric switch 108 is not directly specified in DA 402. At Step 1140, an indirect fabric switch port identification is applied. The particular fabric switch 108 may be chosen at random or may be selected on the basis of other information, such as the content of the flow fields in the frame. Various traffic conditions may also be considered. Step 1136 follows Step 1140.

Returning now to Step 1110, if the result of Step 1110 is negative, then DA 402 indicates a data plane format and the address is a data-frame flow-zone address 600. In that case, the procedure continues to Step 1142, in which DA 402 may be checked for validity. If the result is negative, then corrective actions may be taken in Step 1144, after which rack forwarding procedure 1100 terminates at Step 1146.

If the result of Step 1142 is affirmative, then DA 402 is examined to determine whether the destination is within the local rack; in other words, whether the destination server is connected directly to the rack switch 106 executing Procedure 1100. In more detail, Step 1142 may involve checking that, in DA 402, pod ID field 506 holds the local pod ID 112 and rack ID field 604 holds the local rack ID 114. If both are true, then the result of Step 1148 is affirmative, and (in Step 1150) the frame is passed to the process described as Step 1126. If the result of Step 1148 is negative, then Step 1140 follows.

Frame Forwarding at Zone Level 2

Figure 12:
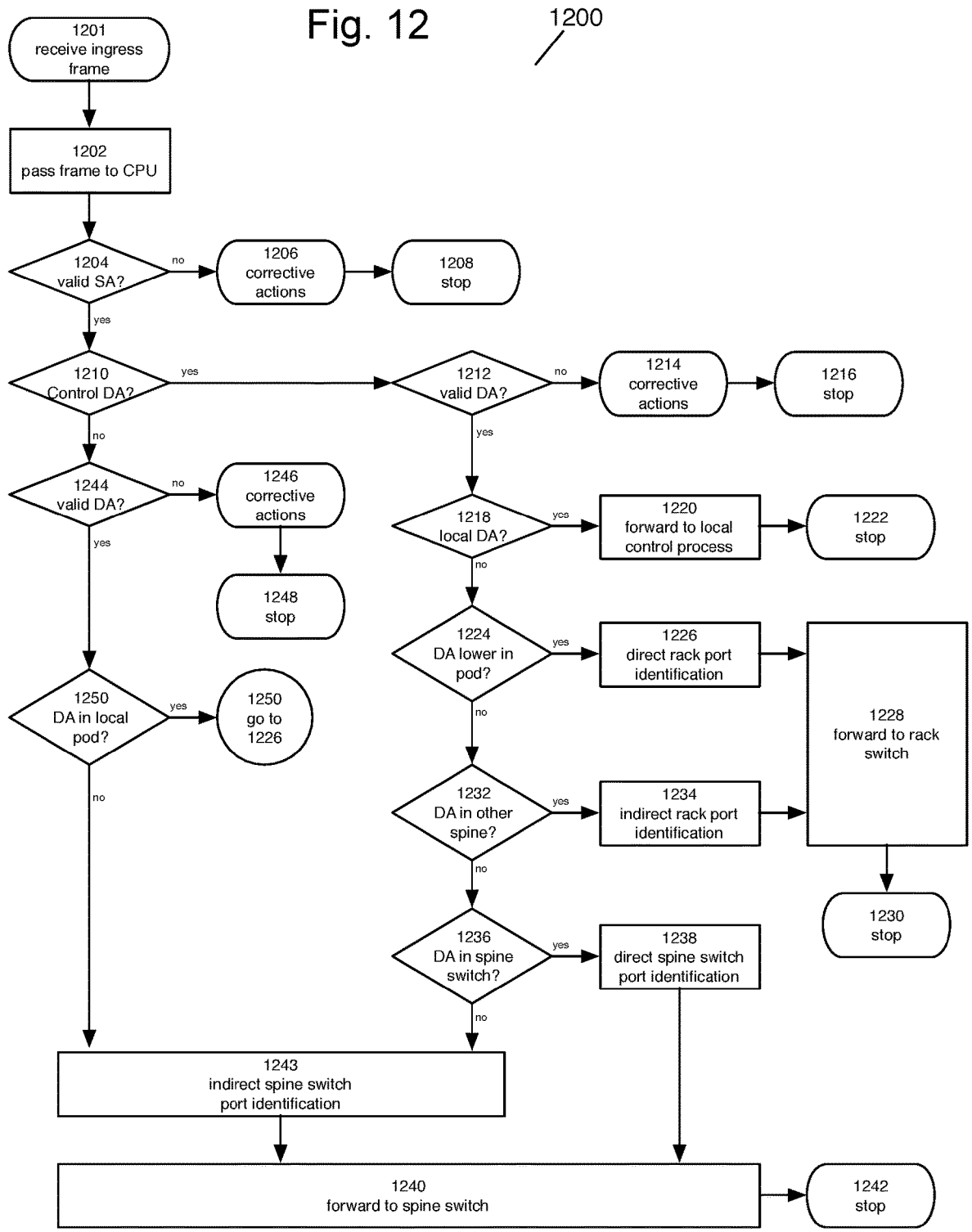
FIG. 12 illustrates fabric switch forwarding procedure 1200.

The fabric switch forwarding procedure 1200 at fabric switch 108 is illustrated in the flow chart of FIG. 12.

The fabric switch 108 receives ingress frame 210 via ingress port 203 in Step 1201 and passes the frame to its CPU 212 in Step 1202. The remaining steps are executed by CPU 212.

In Step 1204, the frame SA 404 may be checked for validity. If the result is negative, then corrective actions may be taken in Step 1206, after which fabric switch forwarding procedure 1200 terminates at Step 1208.

If the result of Step 1204 is affirmative, then (in Step 1210) data plane format bit 626 of DA 402 is checked. If the value of that bit is 0, then DA 402 indicates a control plane format, and the procedure continues to Step 1212, in which DA 402 may be checked for validity. If the result is negative, then corrective actions may be taken in Step 1214, after which fabric switch forwarding procedure 1200 terminates at Step 1216.

If the result of Step 1212 is affirmative, then DA 402 is examined in Step 1218 to determine whether the destination is local; in other words, whether the destination control process is one on the switch executing Procedure 1200. In more detail, Step 1218 may involve checking that all of the following are true regarding DA 402: first info bit 624 is 0, second info bit 620 is 0, pod ID field 606 holds the local pod ID 112, and spine ID field 804 holds the local spine ID 118. If so, then the result of Step 1218 is affirmative, the frame is passed to the local control process in Step 1220, and fabric switch forwarding procedure 1200 terminates at Step 1222.

If the result of Step 1218 is negative, then the destination is determined to be non-local and Step 1224 determines whether the destination is lower in the pod; in other words, within a rack switch 106 or server 102 in the pod. In more detail, Step 1224 may involve checking that the following are true regarding DA 402: first info bit 624 differs from second info bit 620 and pod ID field 606 holds the local pod ID 112. If so, then the result of Step 1224 is affirmative and direct rack port identification of Step 1226 is executed. In Step 1226, the value of rack ID 112 in the rack ID field 604 of the DA 402 is used to identify the particular port ID 204 of the local port 202 matching that rack ID 112 value. Depending on the embodiment, the identification can be obtained by inspection or by lookup in flow-zone database 208. In Step 1228, the (possibly modified) frame is forwarded as egress frame 214 to attached rack switch 106 via the egress port 216 of the identified port ID 204, after which fabric switch forwarding procedure 1200 terminates at Step 1230.

If the result of Step 1224 is negative, then Step 1232 proceeds to determine whether the destination is in a different spine. Note that rack switch 106 and server 102 are in no spine, so the affirmative results only if DA 402 identifies either a fabric switch 108 or spine switch 104 that is on a spine different from spine ID 118 of the local fabric switch 108. The result is affirmative if first info bit 624 equals second info bit 620 (indicating that the format of DA 402 is that of either fabric switch flow-zone address 801 or spine switch flow-zone address 802) and that the content of spine ID field 804 differs from spine ID 118 of the local fabric switch 108. In that case, in Step 1234 an indirect rack port identification is applied. The particular rack switch 106 may be chosen at random or may be selected on the basis of other information, including in particular the content of the flow fields in the frame. Various traffic conditions may also be considered. Following Step 1234, Step 1228 follows.

If the result of Step 1232 is negative, then the destination is either in another pod or in a spine switch in the same spine. Step 1236 makes the determination. The result is affirmative if first info bit 624 equals 1 and second info bit 620 equals 1 (indicating that the format of DA 402 is that of spine switch flow-zone address 802). In that case, direct spine switch port identification in Step 1238 proceeds to directly identify the output port. Step 1238 identifies the destination spine switch from spine switch ID field 906 of DA 402 and then selects a port ID 204 accordingly. Depending on the embodiment, the identification can be based on inspection or by lookup in flow-zone database 208. In Step 1240, the (possibly modified) frame is forwarded as egress frame 214 to attached spine switch 104 via the egress port 216 of the identified port ID 204, after which fabric switch forwarding procedure 1100 terminates at Step 1242.

If the result of Step 1236 is negative, then the destination is in another pod. In this case, at Step 1243, an indirect spine switch port identification is applied. The particular spine switch 104 may be chosen at random or may be selected on the basis of other information, including in particular the content of the flow fields in the frame. Various traffic conditions may also be considered. Following Step 1243, Step 1240 follows.

Returning now to Step 1210, if the result of Step 1210 is negative, then DA 402 indicates a data plane format. In that case, the procedure continues to Step 1244, in which DA 402 may be checked for validity. If the result is negative, then corrective actions may be taken in Step 1246, after which fabric switch forwarding procedure 1200 terminates at Step 1248.

If the result of Step 1244 is affirmative, then DA 402 is examined to determine whether the destination is within the local pod; in other words, whether the destination data process is within the same pod as the switch executing Procedure 1200. Specifically, Step 1250 determines whether pod ID field 606 of DA 402 holds the local pod ID 112. If so, then the result of Step 1250 is affirmative, and the frame, in Step 1250, is passed to Step 1226 in preparation for forwarding to the correct destination rack.

If the result of Step 1250 is negative, then the frame is passed to Step 1243 in preparation for forwarding to a spine switch.

Frame Forwarding at Zone Level 3

Figure 13:
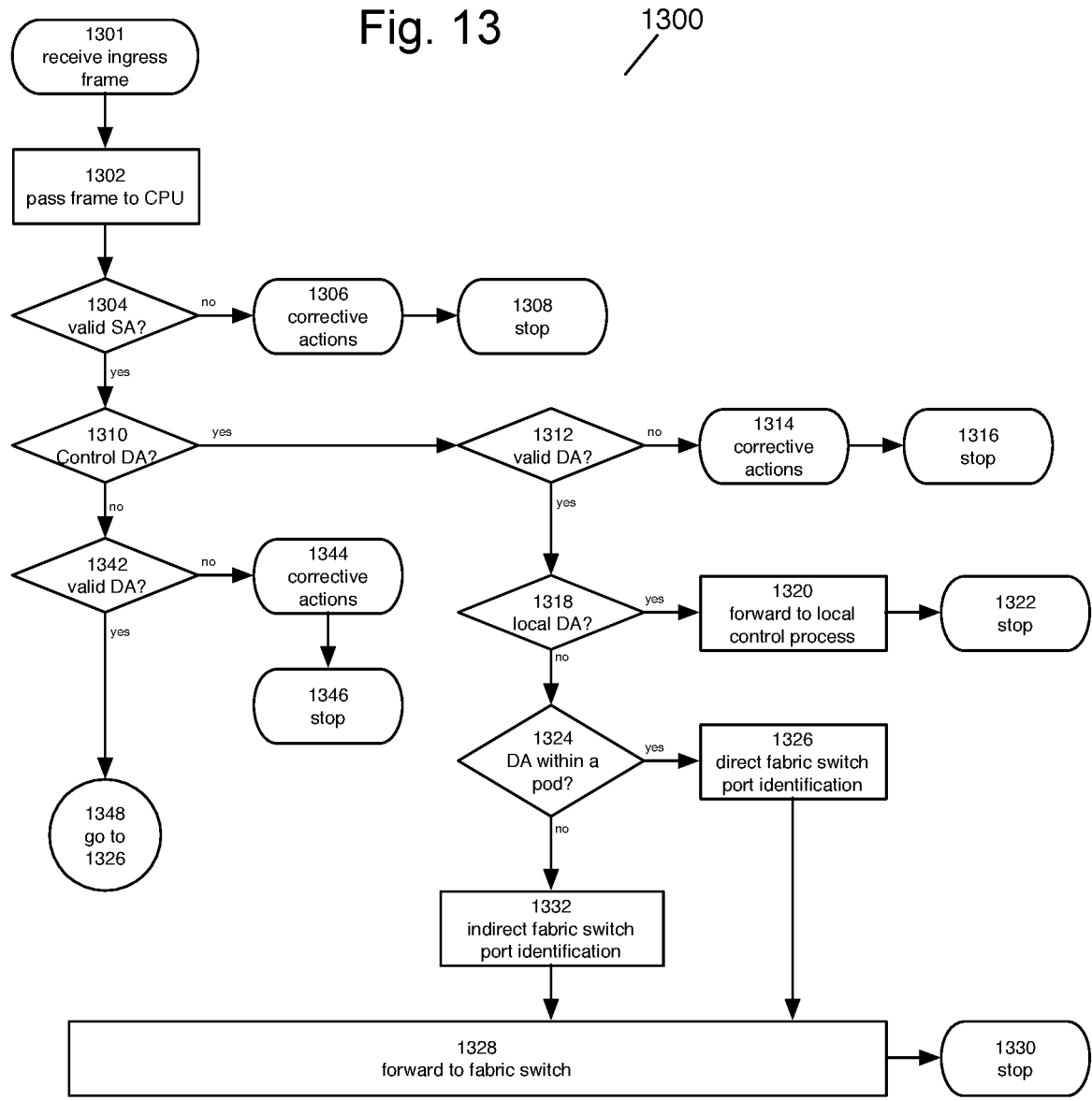
FIG. 13 illustrates spine switch forwarding procedure 1300.

The spine switch forwarding procedure 1300 at spine switch 104 is illustrated in the flow chart of FIG. 13.

The spine switch 104 receives ingress frame 210 via ingress port 203 in Step 1301 and passes the frame to its CPU 212 in Step 1302. The remaining steps are executed by CPU 212.

In Step 1304, the frame SA 404 may be checked for validity. If the result is negative, then corrective actions may be taken in Step 1306, after which spine switch forwarding procedure 1300 terminates at Step 1308.

If the result of Step 1304 is affirmative, then (Step 1310) data plane format bit 626 of DA 402 is checked. If the value of that bit is 0, then DA 402 indicates a control plane format, and the procedure continues to Step 1312, in which DA 402 may be checked for validity. If the result is negative, then corrective actions may be taken in Step 1314, after which spine switch forwarding procedure 1300 terminates at Step 1316.

If the result of Step 1312 is affirmative, then DA 402 is examined in Step 1318 to determine whether the destination is local; in other words, whether the destination control process is one on the switch executing Procedure 1300. In more detail, Step 1318 may involve checking that all of the following are true regarding DA 402: first info bit 624 is 1, second info bit 620 is 1, spine switch ID field 906 holds the local spine switch ID 122, and spine ID field 804 holds the local spine ID 118. If so, then the result of Step 1318 is affirmative, the frame is passed to the local control process in Step 1320, and spine switch forwarding procedure 1300 terminates at Step 1322.

If the result of Step 1318 is negative, then the destination is determined to be non-local and Step 1324 determines whether the destination is within a pod, by checking whether first info bit 624 and second info bit 620 of DA 402 are not both equal to 1. If they are not both equal to 1, then, using direct fabric switch port identification in Step 1326, the value of pod ID field 606 of the DA 402 is used to identify the particular port ID 204 of the local port 202 matching that pod ID field 606 value. Depending on the embodiment, the identification can be obtained by inspection or by lookup in flow-zone database 208. In Step 1328, the (possibly modified) frame is forwarded as egress frame 214 to the connected fabric switch 108 via the egress port 216 of the identified port ID 204, after which spine switch forwarding procedure 1300 terminates at Step 1330.

If the result of Step 1324 is affirmative, then first info bit 624 and second info bit 620 of DA 402 are both equal to 1 and the destination is in a spine switch, which can be reached via forwarding to a fabric switch 108. In that case, an indirect fabric switch port identification is applied in Step 1332. The particular fabric switch 108 may be chosen at random or may be selected on the basis of other information, including in particular the content of the flow fields in the frame. Various traffic conditions may also be considered. Following Step 1332, Step 1328 follows.

Returning now to Step 1310, if the result of Step 1310 is negative, then DA 402 indicates a data plane format. In that case, the procedure continues to Step 1344, in which DA 402 may be checked for validity. If the result is negative, then corrective actions may be taken in Step 1346, after which spine switch forwarding procedure 1300 terminates at Step 1348.

If the result of Step 1344 is affirmative, then DA 402 needs to be forwarded to the pod identified in DA 402, so in Step 1348 the frame is passed to Step 1326.

Port Identification by Inspection

The description above indicates that forwarding databases and lookups may in some cases be unnecessary, provided that certain identifiers of elements are assigned to so that the port ID 204 at which the element is connected can be determined by inspection of the identifier. In particular:

- At rack switch 106, direct server port identification of Step 1126 uses the value of server ID field 608 of the DA 402 to identify a particular port ID 204. The identification can be obtained by inspection if the appropriate port ID 204 is determinable by inspection of server ID field 608.
- At rack switch 106, direct fabric switch port identification of Step 1134 uses the value of spine ID field 804 of the DA 402 to identify a particular port ID 204. The identification can be obtained by inspection if the appropriate port ID 204 is determinable by inspection of spine ID field 804.
- At fabric switch 108, direct rack port identification of Step 1226 uses the value of the rack ID field 604 of the DA 402 to identify a particular port ID 204. The identification can be obtained by inspection if the appropriate port ID 204 is determinable by inspection of rack ID field 604.
- At fabric switch 108, direct spine switch port identification of Step 1238 uses the value of spine switch ID field 906 of DA 402 to identify a particular port ID 204. The identification can be obtained by inspection if the appropriate port ID 204 is determinable by inspection of spine switch ID field 906.
- At spine switch 104, direct fabric switch port identification of Step 1326 uses the value of pod ID field 606 of the DA 402 to identify a particular port ID 204. The identification can be obtained by inspection if the appropriate port ID 204 is determinable by inspection of pod ID field 606.

A port ID 204 value can be easily obtained from inspection of an identifier if the appropriate port ID 204 value is identical to the identifier or a subset of the bits of the identifier. Other methods of arranging for identification by inspection are incorporated in other embodiments.

A method of organizing the identity numbering to achieve these conditions is illustrated in FIG. 14. Note the following, which meets the five conditions above:

- The bottom row of four switches in FIG. 14 are rack switches 106, identified by the rack ID 114 values "e", "f," "g", and "h". Each of the four port ID 204 values "E", "F", "G", and "H" of the port 202 matches the corresponding server ID 116 of the attached servers 102.
- The next higher row of four switches in FIG. 14 indicate fabric switches 108, all in the same pod 110, that pod identified with pod ID 112 value J, indicated on the left of the switch rectangle. Each fabric switch 108 is connected to each rack switch 106. In each case, the rack ID 114 value ("e", "f," "g", or "h") matches the port ID 204 value of the port 202 of the fabric switch 108 at which the rack switch 106 is connected.
- The top two rows of four switches in FIG. 9 indicate spine switches 104. Four spines are shown; the spine switches 104 and the fabric switches 108 each identified by a spine ID 118, with the values "A", "B", "C", and "D" shown on the right of the switch rectangle.
- Within each spine, each spine switch 104 is identified by a spine switch ID 122, with the values shown as "a" and "b". In each case, the spine switch ID 122 value ("a" or "b") matches the port ID 204 value of the port 202 of the fabric switch 108 at which the spine switch 104 is connected.
- The spine ID 118 value ("A", "B", "C", or "D") of fabric switch 108 matches the port ID 204 value of the port 202 of the rack switch 106 at which that fabric switch 108 is connected.

Address Assignment

In some embodiments, automated configuration of the network establishes a set of element identifiers that allow forwarding based on inspection rather than forwarding tables, as described above. Automated configuration procedure 1500 is shown in FIG. 15.

Automated configuration procedure 1500 begins at Step 1501. At Step 1502, each spine switch 104 sends a message to each enabled port, indicating that the recipient's pod ID 112 value is the 7 least significant bits of the port ID 204 value of the egress port 216 of that spine switch 104.

At Step 1504, fabric switch 108 receives the messages sent by the spine switches 104 at Step 1502, identifies those ports as connected to spine switches, confirms that all the received messages are consistent, identifies itself as a fabric switch, configures its pod ID 112 value as received, and replies to each spine switch 104, indicating that the recipient's spine switch ID 122 value is the 7 least significant bits of the port ID 204 value of the egress port 216 of that fabric switch 108.

At Step 1506, fabric switch 108 sends a message to each other enabled port, indicating that the recipient's pod ID 112 is the value of the sender's pod ID 112 and that the recipient's rack ID 114 value is the 7 least significant bits of the port ID 204 value of the egress port 216 of that fabric switch 108.

At Step 1508, rack switch 106 receives the messages sent by the fabric switches 108 at Step 1506, identifies those ports as connected to fabric switches, confirms that all received messages are consistent, identifies itself as a rack switch, configures its pod ID 112 and rack ID 114 value as received, and replies to each fabric switch 108, indicating that recipient's spine ID 118 value is the 7 least significant bits of the port ID 204 value of the egress port 216 of that rack switch 106.

At Step 1510, rack switch 106 sends a message to each other enabled port, indicating that the recipient's pod ID 112 is the value of the sender's pod ID 112, that the recipient's rack ID 114 is the value of the sender's rack ID 114, and the recipient's server ID 102 value is the 7 least significant bits of the port ID 204 value of the egress port 216 of that rack switch 106.

At Step 1512, server 102 receives the message sent by the rack switch 106 at Step 1510 and configures its pod ID 112, rack ID 114, and server ID 102 values as received.

At Step 1514, fabric switch 108 receives the messages sent by the rack switches 106 at Step 1508, identifies those ports as connected to rack switches, confirms that all messages from rack switches 106 are consistent, and configures its spine ID 118 value as received.

At Step 1516, Procedure 1500 stops.

Stateless Port Lookup

Consider, for example, a system in which all switches are scaled to maximum dimension with respect to the address formats of FIGS. 6-9. For example, those formats provide enough address to support 128 spines, 128 spine switches per spine, 128 pods, 128 racks per pod, and 128 servers per rack. In this case, a spine switch requires 128 ports in order to allocate one per pod. A fabric switch requires 128 ports to link to 128 spine switches and another 128 ports to link to 128 rack switches. Likewise, a rack switch requires 128 ports to link to 128 fabric switches and another 128 ports to link to 128 servers. This means that, while the address format supports 128 identifiers of each form, both fabric switches and rack switches require 256 ports.

In this circumstance, since fabric switch 108 and rack switch 106 have 256 ports, the each require 256 port IDs 204; therefore, their port identifiers will use 8 bits. It is impossible to represent the entire 8-bit port address in a 7-bit address element field. Therefore, Procedure 1500 makes assignment based only on 7 least significant bits of the port IDs 204.

For each frame to be forwarded, fabric switch 108 and rack switch 106 need to select a forwarding port from two ports, each of which match the relevant identifier in the 7 least significant bits. However, this is not a limitation regarding stateless operation because each switch can readily determine which of the two ports is correct. Recall that, in Procedure 1500, fabric switch 108 identifies which ports are connected to spine switches 104 and which are connected to rack switches 106; and, likewise, rack switch 106 identifies which ports are connected to fabric switches 108 and which are connected to servers 102. As a result, any of these switches is able to decide which of the two ports is correct because it always knows what type of switch is at the next hop.

For example, in Step 1126, the value of server ID 116 in the server ID field 608 of the DA 402 is used to identify the particular port ID 204 of the local port 202 matching that server ID 116 value. Here the server ID 116 provides the 7 least significant bits of port ID 204. However, only one of the two ports matching that description connects to a server 102; that port is selected.

This identification of ports is essentially static and requires an extremely small amount of memory; just one bit per port. However, in some embodiments, the memory burden is further reduced by cable layout. For example, cabling may be arranged so that the lower-numbered ports (e.g., with port ID values of 0 through 127) of rack switch 106 are connected to servers, while the higher-numbered ports (e.g., with port ID values of 128 through 255) are connected to fabric switches. In this case, the switch need not store the identifications of the ports; it need simply recall that ports numbered with a 1 in the first significant bit lead to fabric switches and those with 0 in the first significant bit lead to servers.

Flow Structure

As shown in FIG. 6-9, each address format includes the address header field 616 and provides unique identification of the network element (server 102 or flow-zone switch 200) using an additional two or three bytes, leaving two or three more bytes available for flow-level fields 0, 1, and sometimes 2. These may be allocated as useful to distinguish among the flows, particularly the various flows supported within the network element. If a flow is identified within the source address, then response frames specifying that original source as a destination may carry the same flow identification information in the destination address and allow the switch to direct the response data to the correct flow.

While the flow-level information in the frame is useful to the source and destination switches, it may also be useful to the intervening forwarding switches. Both the SA 404 and the DA 402 contain identifiers of the flow, from the source and destination perspectives, respectively. When the two perspectives are combined, the switch sees a more complete representation of a flow. The intervening switches may make decisions on forwarding, queueing, etc., based on the flow; for example, on observation of historical transfer of frames per flow. In some cases, the switch may incorporate a database identifying properties of specific flows or identifying actions to be taken when frames of certain flows are received. As simple examples, the data rate of all flows, or of certain specific flows, can be limited over certain periods of time by certain algorithms, or all frames of a flow can be forwarded on the same path.

In some cases, specific treatment of specific frames based on flow may prove too cumbersome; for example, storing a database of flow actions based on specific flows could require significant resources for both storage and communication. Alternatively, in some cases a flow type identifier serves as a simpler but useful alternative. Many flows may share a flow type and would be treated similarly. Flow types are discussed below. A flow parameter set comprises flow-level information such as flow identifiers and flow type identifiers.

Flow Identification

Address formats may provide address bytes that can be used to identify a flow, possibly a hierarchical flow.

As discussed above, server 102 may be provided with one or more virtual machines (VMs) 316 that may represent a process to which network data may be directed and from which it may be sourced. VM 316 is uniquely identified within server 102 by VM ID 320, stored in memory 306 and associated with the VM 316 that it identifies.

In practice, the virtual machine concept may be less likely to be incorporated into a flow-zone switch 200, but that switch may nevertheless support flow differentiation and identification. Flow-level fields 0, 1, and 2 could be used in that case for various purposes. While the disclosure below refers in some instances to data frames 218, the same approach is in many cases applicable to switch frames as well, and the disclosure should not be considered limited to data frames 218 only.

Flow-Zone Switching: Flow Level 1

As discussed above, when server 102 is provided with a virtual machine (VM) 316, VM 316 is uniquely identified within server 102 by VM ID 320, stored in memory 306 and associated with the VM 316 that it identifies. CPU 312 is enabled to receive a data unit 318 from VM 316, accompanied by the value of VM ID 320 of that VM 316. CPU 312 is enabled to parse data unit 318 and determine the content of fields therein, to use those fields in a referral to flow-zone database 308, in memory 306, to determine zero or more egress frames 314, and to forward those egress frames 314 to port 302. CPU 312 may also be enabled to update flow-zone database 308 according to information obtained from the receipt of data unit 318 and accompanying information.

As discussed above, when server 102 is provided with a virtual machine (VM) 316, CPU 312 is enabled to read ingress frame 310. CPU 312 is enabled to parse ingress frame 310 and determine the content of fields therein. Based on those fields, CPU 312 is enabled to refer to flow-zone database 308 in determining zero or more data units 318 and selecting zero or more VMs 316 (identified by VM ID 320) to which to forward those data units 318. CPU 312 may also be enabled to update flow-zone database 308 according to information obtained from the receipt of ingress frame 310 and accompanying information.

In an embodiment, after CPU 312 receives data unit 318, it inserts the value of VM ID 320, of the originating VM 316, as the flow level 1 ID field 510 of SA 404 of the resulting egress data frame 314. In some cases, the flow level 1 ID field 510 may instead be determined from a database using VM ID 320 as the lookup input.

In an embodiment, after CPU 312 receives ingress frame 310, it directs data unit 318 to its VM 316 whose identifier VM ID 320 is equal to the flow level 1 ID field 510 of DA 402 of ingress frame 310. In some cases, the VM ID 320 may instead be determined from a database using flow level 1 ID field 510 as the lookup input.

Thus, the flow level 1 ID field 510 can be used as another level of differentiation in the source and destination hierarchy.

Flow-Zone Switching: Flow Level 0

At flow level 0, flow level 0 ID field 512 is available to differentiate the flow within a VM 316. This field may be used in various ways and may depend on how VM 316 internal operation is organized.

In an embodiment, services executing on VM 316 communicate by exchanging data segments with other services running on other VMs 316, possibly on other servers 102. In order to separate multiplexed data from multiple services, two service IDs 322 are attached to the data segment, one to DA 402 to represent the source service ID 322 and another to SA 404 to represent the destination service ID 322.

In an embodiment, CPU 312 receives a data unit 318 from VM 316, accompanied by a service ID 322 of the source service of data unit 318, and inserts the value of that service ID 322 into the flow level 0 ID field 512 of SA 404 of the resulting egress data frame 314. In some cases, the flow level 0 ID field 512 may instead be determined from a database using service ID 322 as the lookup input.

In an embodiment, after CPU 312 receives ingress frame 310, it directs data unit 318 to its appropriate VM 316, identifying the service destination of data unit 318 by a service ID 322 created as the flow level 0 ID field 512 of DA 402 of ingress frame 310. In some cases, the service ID 322 may instead be determined from a database using the flow level 0 ID field 512 as the lookup input.

Thus, the flow level 0 ID field 512 can be used as additional differentiation in the source and destination hierarchy, carrying the source and destination service ID 322 at VM 316.

Standardized Interface with Layer 3

In some embodiments, VM 316 does not prepare Layer 3 data packets in a standard Layer 3 format, such as Internet Protocol (IP). Flow-zone network 100 is enabled to deliver data among VM 316 using DA 402 and SA 404 in frames, so many aspects of Layer 3 functionality are redundant with flow-zone network 100 and may not be necessary.

However, in some embodiments, VM 316 prepares Layer 3 data packets in a standard Layer 3 format, such as Internet Protocol (IP). In some embodiments, flow-zone network 100 carries the contents of these data packets by encapsulating them using the data field 408 of data frame 218.

In IP networks, IP addresses are uniquely assigned to communicating network elements. In some typical cases, assignment is made by an administrator or with an automated process using, for example, a DHCP server. In some typical cases, IP addresses are assigned to virtual machines, such as VM 316. In the IPv4 format, IP addresses are four bytes (32 bits).

Figure 16:
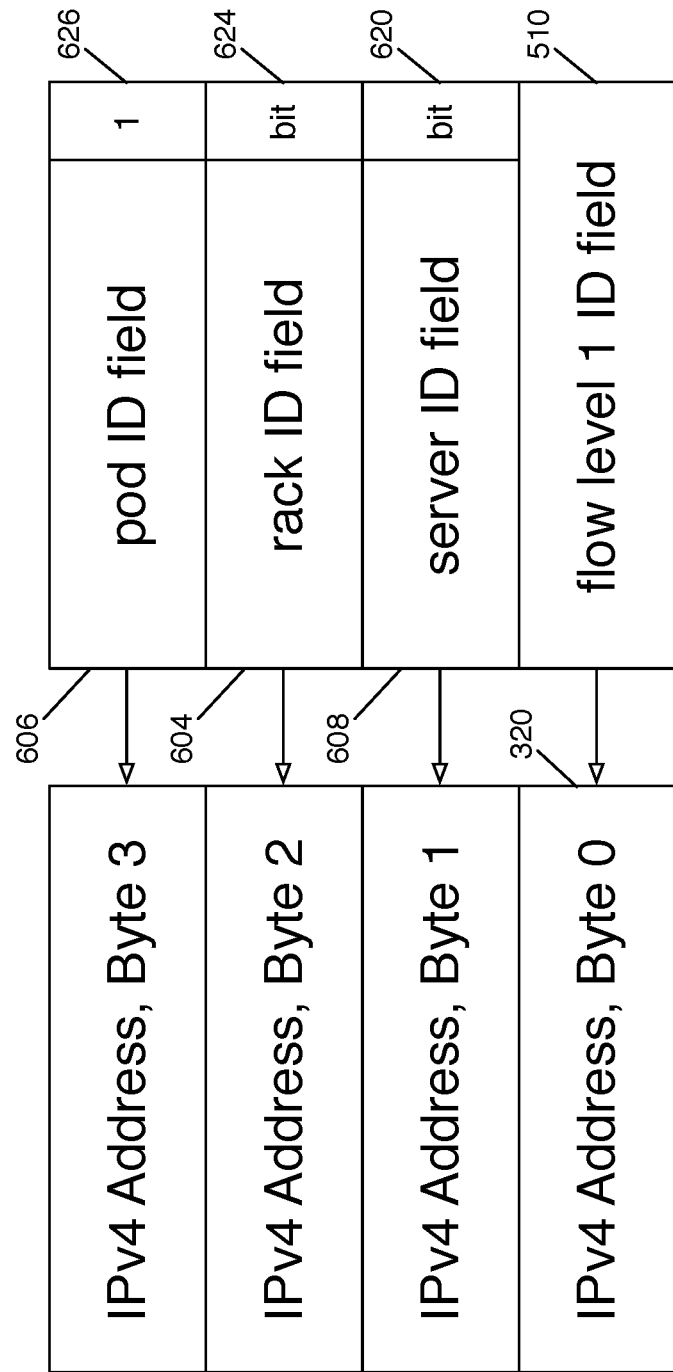
FIG. 16 illustrates an embodiment of assignment of IP addresses, based on Layer 2 addresses, to virtual machines.

In some embodiments of this disclosure, IPv4 addressing is used by VM 316 and the content of the IPv4 address assigned to the VM 316 is uniquely related to a portion of the data-frame flow-zone address 600. In some embodiments, an IPv4 address is assigned to the VM 316 as the concatenation of the pod ID field 606, data plane format bit 626, the rack ID field 604, first info bit 624, the server ID field 508, second info bit 620, and the flow level 1 ID field 510 of the VM 316, which may serve as VM ID 320, as shown in FIG. 16.

In some embodiments of this disclosure, IPv4 addressing is used by flow-zone switch 200 for switch frames, and the content of the IPv4 address assigned to a process on that switch is uniquely related to a portion of the switch frame flow-zone address. In some embodiments, an IPv4 address is assigned to a process on the flow-zone switch 200, similar to FIG. 16.

Using these IPv4 address assignments, each server 102 and flow-zone switch 200 may have unique IPv4 assignments made to the differentiated VMs 316 and other processes.

The IPv4 protocol specifies a Layer 3 data packet format in which the source and destination IPv4 addresses are explicitly carried within parsable packet fields. In some embodiments, since the source and destination IPv4 addresses are implicitly carried in the DA 402 and SA 404 of the frame, those values are suppressed from the data field 408 of data frame 218 or of a switch frame. In some embodiments, server 102 reconstructs a Layer 3 data packet upon receipt, restoring the suppressed source and destination IPv4 addresses based on the values implicitly carried in the DA 402 and SA 404.

The standard Layer 3 and Layer 4 headers contain additional data that is associated with the packet and segment but not with either the source or destination explicitly. In an embodiment, some of these additional elements are carried in the Layer 2 frame in Layer 2 fields, as described below.

Flow-Zone EtherType Field

In order to carry additional Layer 2 fields in the frame, some embodiments make use of the flow-zone EtherType field with subfields.

As discussed earlier, the typical Layer 2 Ethernet frame includes an EtherType field 406 that may indicate the type of data in the frame. In some typical cases, the EtherType field 406 is used with subfields. As an illustrative example of this prior art, a standard VLAN tag can be used in an Ethernet frame. In that case, a particular reserved EtherType value (the VLAN EtherType, with hex value 0x8100) signifies that the VLAN frame format is used. Following the VLAN EtherType is a two-byte Tag Control Information field that, per IEEE Standard 802.1Q, specifies additional information regarding the frame; including a VLAN identifier and priority value.

In accordance with that concept, some embodiments of the flow-zone network 100 incorporate a flow-zone EtherType field to identify the frame as a flow-zone formatted frame, in some embodiments following that flow-zone EtherType field with one or more flow-zone EtherType subfields. Flow-zone EtherType subfields may include detailed formatted information regarding, for example, one or more of the following:

the format of the set of flow-zone EtherType subfields;
the format of the flow-zone DA 402 and SA 404;
flow type ID;
flow priority ID;
Layer 3 protocol ID;
Layer 4 protocol ID;
differentiated service type;
congestion notification;
fragmentation information;
other information extracted from or determined by Layer 4 and/or Layer 3 headers;
VLAN ID;
preferred route or routes; and
actual route.

In some embodiments, the "flow type ID" among the flow-zone EtherType subfields identifies a flow type that specifies the nature of the flow. In some embodiments, the action of flow-zone switch 200 following receipt of data frame 218 depends on that identified flow type. In general, flow-zone switch 200 may be able to identify the specific flow from other aspects of data frame 218 and use a lookup to determine the flow type; however, that approach might require additional state, for example, storage of a database associating the specific flow identity with a flow type. Embodiments may use the flow type ID to reduce the reliance on such state. In general, the flow-zone EtherType subfields may allow other types of information to be carried directly in the data frame 218, reducing the requirements to maintain state in flow-zone switch 200. In some embodiments, both flow identity and flow type are conveyed within DA 402 and SA 404 and need not be repeated in the flow-zone EtherType subfields.

Regarding the "preferred route or routes", the forwarding route of frames is to a large degree embodied in the DA 402. However, as discussed above, some aspects of the route are not explicit in the DA 402. For example, the data-frame flow-zone address 600 does not implicit specify the spine ID 118 on which to forward data frame 218. In some circumstances, any spine will suffice. However, in some embodiments, some spines are more suitable than others to carrying a specific frame. For example, some time-critical frames may be preferentially forwarded onto specific spines that are kept lightly-loaded in order to respond quickly to time-critical traffic. By specifying such a spine (by specifying its spine ID 118) in the flow-zone EtherType subfields, the server 102 can identify a routing preference to flow-zone switch 200. In some embodiments, flow-zone switch 200 forwards data frame 218 preferentially according to a route specified among the flow-zone EtherType subfields. In some embodiments, that route is specified by specifying spine ID 118. For rack switch 106 to successfully forward to the specified spine, it requires access to a spine lookup in which the input is the specified "spine ID 118" value and the output is the port to the fabric switch 108 whose spine ID 118 matches that retrieved value. Alternatively, as discussed earlier, spine lookup may be avoided if the spine IDs 118 are assigned in accordance with the port ID 204 values of rack switch 106.

Regarding the "actual route", in some embodiments, flow-zone switch 200 modifies data frame 218 by inserting into the flow-zone EtherType subfields a route identifier signifying an actual route taken by data frame 218. In some embodiments, that identifier is an identifier of the specific flow-zone switch 200 inserting the route identifier. Such actual route information may be useful by other network elements later receiving the modified data frame 218. Changes to the frame may require recalculation of the FCS 410 value.

What is claimed is:

1. A method of forwarding data by a data switch located within a network, comprising:
    from a memory of the data switch or from one or more ports of the data switch, receiving an ingress packet including the data, a destination address, and a source address;
    determining the location of a destination of the data, as indicated by a destination zone identifier within the destination address;
    determining a flow parameter set, found within one or more of the destination address and source address;
    in accordance with the flow parameter set, selecting an egress port from among a plurality of egress ports leading toward the indicated location of the destination of the data; and
    forwarding the data to the selected egress port.

2. The method of claim 1, further comprising placing the data in a queue selected in accordance with the flow parameter set or scheduling the forwarding of the data in accordance with the flow parameter set.

3. The method of claim 1, wherein content of the flow parameter set is partially or entirely found within the source address.

4. The method of claim 1, wherein data sent to the selected egress port is accompanied by suppressed or compressed frame header data restored in accordance with the flow parameter set.

5. A data switch configured to forward data of an ingress packet, comprising:
    one or more ports;
    a memory;
    a processing unit configured to:
    from a memory of the data switch or from one or more ports of the data switch, receive an ingress packet including the data, a destination address, and a source address;
    determine the location of a destination of the data, as indicated by a destination zone identifier within the destination address;
    determine a flow parameter set, found within one or more of the destination address and source address;
    in accordance with the flow parameter set, select an egress port from among a plurality of egress ports leading toward the indicated location of the destination of the data; and
    forward the data to the selected egress port.

6. The data switch of claim 5, wherein the processing unit is further configured to place the data in a queue selected in accordance with the flow parameter set or schedule the forwarding of the data in accordance with the identified flow parameter set.

7. The data switch of claim 5, wherein content of the flow parameter set is partially or entirely found within the source address within the ingress packet.

8. The data switch of claim 5, wherein data sent to the selected egress port is accompanied by suppressed or compressed frame header data restored in accordance with the flow parameter set.

9. The method of claim 1, wherein the identity of the selected egress port is found from calculation using information found explicitly within the ingress packet, without use of forwarding tables.

10. The data switch of claim 5, wherein the processing unit is further configured to identify the selected egress port from calculation using information found explicitly within the ingress packet, without use of forwarding tables.

11. The method of claim 1 wherein the flow parameter set comprises a flow type identifier.

12. The data switch of claim 5 wherein the flow parameter set comprises a flow type identifier.

13. The method of claim 9 wherein the flow parameter set comprises a flow type identifier.

14. The data switch of claim 10 wherein the flow parameter set comprises a flow type identifier.

* * * * *